US009954650B2

(12) United States Patent
Tabet et al.

(10) Patent No.: US 9,954,650 B2
(45) Date of Patent: *Apr. 24, 2018

(54) DELAYED AND BUNDLED RETRANSMISSIONS FOR LOW BANDWIDTH APPLICATIONS

(71) Applicant: Apple Inc., Cupertino, CA (US)

(72) Inventors: Tarik Tabet, San Jose, CA (US); Vinay R. Majjigi, Sunnyvale, CA (US); Syed A. Mujtaba, Santa Clara, CA (US); Christian W. Mucke, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/439,568

(22) Filed: Feb. 22, 2017

(65) Prior Publication Data

US 2017/0163387 A1 Jun. 8, 2017

Related U.S. Application Data

(63) Continuation of application No. 14/498,973, filed on Sep. 26, 2014, now Pat. No. 9,615,329.

(Continued)

(51) Int. Cl.
*H04L 1/18* (2006.01)
*H04W 76/04* (2009.01)
(Continued)

(52) U.S. Cl.
CPC .......... *H04L 1/1854* (2013.01); *H04L 1/1671* (2013.01); *H04L 1/1812* (2013.01);
(Continued)

(58) Field of Classification Search
CPC ... H04L 1/1825; H04L 1/1887; H04L 1/1671; H04W 52/0222
See application file for complete search history.

(56) References Cited

U.S. PATENT DOCUMENTS 8,370,696 B2 2/2013 Sagfors et al.
8,611,265 B2 12/2013 Lee et al.
(Continued)

FOREIGN PATENT DOCUMENTS

CN 101682488 A 3/2010
CN 102823184 A 12/2012
(Continued)

OTHER PUBLICATIONS

International Search Report and Written Opinion for PCT Application No. PCT/US2014/057567, dated Dec. 23, 2014.
(Continued)

*Primary Examiner* — Redentor Pasia
(74) *Attorney, Agent, or Firm* — Downey Brand LLP

(57) ABSTRACT

Apparatus and methods are disclosed for performing delayed hybrid automatic repeat request (HARQ) communications in the downlink (DL) to reduce power consumption for a user equipment (UE) during a connected mode discontinuous reception (C-DRX) cycle. An enhanced NodeB can be configured to monitor a physical uplink control channel (PUCCH) for DL HARQ information to determine when the PUCCH contains a negative acknowledgement (NACK) message, and in response to determining that the PUCCH contains a NACK message, the eNodeB can wait until a next C-DRX ON duration to transmit a HARQ DL retransmission. The eNodeB can also determine whether or not to bundle the HARQ DL retransmission in consecutive transmission time intervals, based on a signal to interference plus noise ratio (SINR) associated with the UE.

20 Claims, 15 Drawing Sheets

Related U.S. Application Data

(60) Provisional application No. 61/884,918, filed on Sep. 30, 2013.

(51) Int. Cl.
   *H04W 52/02* (2009.01)
   *H04L 1/16* (2006.01)

(52) U.S. Cl.
   CPC ....... *H04L 1/1864* (2013.01); *H04W 52/0222* (2013.01); *H04W 76/048* (2013.01); *H04W 76/28* (2018.02)

(56) References Cited

U.S. PATENT DOCUMENTS

| | | | |
|---|---|---|---|
| 9,473,270 | B2 | 10/2016 | Ko et al. |
| 2009/0046650 | A1 | 2/2009 | Dalsgaard et al. |
| 2009/0245225 | A1 | 10/2009 | Tseng |
| 2009/0313516 | A1 | 12/2009 | Shin et al. |
| 2010/0098006 | A1 | 4/2010 | Golitschek Edler Von Elbwart et al. |
| 2010/0192035 | A1 | 7/2010 | Sagfors et al. |
| 2011/0205928 | A1 | 8/2011 | Pelletier et al. |
| 2011/0256834 | A1 | 10/2011 | Dayal et al. |
| 2012/0218882 | A1 | 8/2012 | Ko et al. |
| 2012/0300742 | A1 | 11/2012 | Eriksson et al. |
| 2013/0010745 | A1 | 1/2013 | Ko et al. |
| 2013/0021995 | A1 | 1/2013 | Ehsan et al. |
| 2013/0028098 | A1 | 1/2013 | Yuda et al. |
| 2013/0051272 | A1 | 2/2013 | Wiberg et al. |
| 2013/0301420 | A1* | 11/2013 | Zhang ................. H04W 76/048 370/241 |
| 2014/0185534 | A1* | 7/2014 | Vos ..................... H04W 72/042 370/329 |

FOREIGN PATENT DOCUMENTS

| | | |
|---|---|---|
| JP | 2002271341 A | 9/2002 |
| JP | 2009253981 A | 10/2009 |
| JP | 2010530709 A | 9/2010 |
| JP | 2013524615 A | 6/2013 |
| JP | 2013528972 A | 7/2013 |
| JP | 2015515160 A | 5/2015 |
| WO | 2013116662 A1 | 8/2013 |

OTHER PUBLICATIONS

Australian Patent Application No. 2014324827—Examiner's Report dated Jul. 26, 2016.
Taiwan Patent Application No. 103133630—Office Action dated Oct. 5, 2015.
International Preliminary Report on Patentability PCT Application No. PCT/US2014/057567, dated Apr. 14, 2016.
Taiwan Patent Application No. 105105157—Search report dated Nov. 7, 2016.
Korean Patent Application No. 10-2016-7007999—Office Action dated Dec. 21, 2016.
European Patent Application No. 14848732.5—European Search Report dated May 11, 2017.
Japanese Patent Application No. 2016-545235—Office Action dated Jun. 2, 2017.
Korean Patent Application No. 10-2017-7030674—Notice of Preliminary Rejection dated Jan. 23, 2018.

* cited by examiner

DELAYED AND BUNDLED RETRANSMISSIONS FOR LOW BANDWIDTH APPLICATIONS

CROSS REFERENCE TO RELATED APPLICATIONS

This application is a continuation of U.S. patent application Ser. No. 14/498,973, filed Sep. 26, 2014, of the same title, which claims the benefit of U.S. Provisional Patent Application No. 61/884,918 filed Sep. 30, 2013 of the same title, the contents of which are incorporated herein by reference in their entirety for all purposes.

FIELD

The described embodiments generally relate to wireless communications and more particularly to procedures for mitigating problems associated with hybrid automatic repeat request (HARQ) scheduling that result in unnecessary power consumption at user equipment.

BACKGROUND

Fourth generation (4G) cellular networks employing newer radio access technology (RAT) systems that implement the 3$^{rd}$ Generation Partnership Project (3GPP) Long Term Evolution (LTE) and LTE Advanced (LTE-A) standards are rapidly being developed and deployed within the United States and abroad. LTE-A brings with it the aggregation of multiple component carriers (CCs) to enable this wireless communications standard to meet the bandwidth requirements of multi-carrier systems that cumulatively achieve data rates not possible by predecessor LTE versions.

One mechanism common to LTE and LTE-A, which allows these 4G telecommunication standards to reliably achieve high data rate throughputs is the Hybrid Automatic Repeat Request (Hybrid ARQ or HARQ). LTE HARQ processes are achieved through the collaboration of an LTE base station, i.e., an enhanced NodeB or eNodeB, and a wireless mobile communication device, i.e., a user equipment or UE, at a time when error packets or transmission errors are received by a UE in the downlink (DL), or at a time when error packets or transmission errors are received by an eNodeB in the uplink (UL).

Hybrid ARQ is a combination of high-rate forward error correction (FEC) coding and ARQ error control. In standard ARQ, redundant bits can be added to data to be transmitted to a receiver using an error detecting code such as a cyclic redundancy check (CRC). Receivers detecting a corrupted message can thereby request a new message from the sender. However, in HARQ, transmission data can be encoded with FEC code, where corresponding parity bits are sent with the transmission data. Alternatively, corresponding parity bits may be transmitted at a subsequent time, upon request, when a receiver detects an erroneous transmission.

Further, LTE communications can also employ connected mode discontinuous reception (C-DRX) operations and semi-persistent scheduling (SPS) to allow 4G LTE enabled UEs to conserve local device resources (e.g. battery power, processing power, available memory, etc.) during various radio resource control (RRC) Connected mode operations, such as when a UE is engaged in low bandwidth application data communications, e.g. during periodic voice over LTE (VoLTE) communications. However, the power conservation benefits of C-DRX and SPS operations can be compromised by overlaying HARQ retransmissions thereon, which requires a UE to remain awake for extended periods of time in order for the UE to be able to transmit/receive HARQ acknowledgement (ACK/NACK) messages and then process corresponding DL or UL HARQ retransmissions.

For certain low bandwidth application data communications, such as VoLTE-type data communications, network-designated LTE HARQ timelines can require a UE to remain awake for longer periods of time than necessary. Accordingly, there exists a need for solutions that can conserve local UE device resources by eliminating or reducing various DL and UL HARQ requirements that necessitate a UE remaining active during time periods when the UE could otherwise enter into a C-DRX or an SPS power saving mode.

SUMMARY

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

Various embodiments disclosed herein provide for a procedure of saving power for a user equipment (UE) communicating via a long term evolution (LTE) network. As part of this procedure a network base station can be configured to monitor a control channel for hybrid automatic repeat request (HARQ) information, receive a negative acknowledgement (NACK) message from the UE, and then in response to receiving the NACK message from the UE, the network base station can delay a HARQ retransmission for the UE such that the UE can remain inactive during a sleep mode of operation.

In accordance with some aspects, the sleep mode of operation may correspond to an OFF duration of a connected mode discontinuous reception (C-DRX) cycle of the UE. Further, the HARQ retransmission may be delayed until a subsequent ON duration of the C-DRX cycle of the UE.

In some implementations, the network base station can bundle the HARQ retransmission for the UE within consecutive downlink transmission time intervals (TTIs).

In some aspects, the bundled HARQ retransmission can be communicated to the UE along with a new downlink transmission on the physical downlink shared channel (PDSCH). The bundled HARQ retransmission can comprise a plurality of HARQ transmissions that employ different modulation and coding schemes (MCSs).

In various embodiments, the network base station can determine to bundle the HARQ retransmission based at least in part on one or more signal to interference plus noise ratio (SINR) conditions of the UE. The one or more SINR conditions of the UE may comprise radio operating conditions that are degraded when the UE is communicating at the periphery of an LTE network cell.

In one aspect, the network base station can determine when the UE is communicating low-bandwidth periodic application data (e.g., voice over LTE or VoLTE data), and then lower a block error rate (BLER) target for the UE to reduce or eliminate HARQ retransmissions for the UE while the UE is communicating the low-bandwidth periodic application data.

In some aspects, the control channel can be a physical uplink control channel (PUCCH) and the NACK can be received from the UE on the PUCCH.

In some embodiments, the mobile device can include at least one transceiver configurable to communicate via a long term evolution (LTE) network, one or more processors, and a storage device storing executable instructions that, when executed by the one or more processors, can cause the mobile device to identify a downlink transmission from a network base station as erroneous, transmit a negative acknowledgement (NACK) message as part of a hybrid automatic repeat request (HARQ) communication to the network base station using the at least one transceiver, and in response to a delayed HARQ retransmission, remain inactive during a sleep mode of operation of the mobile device to conserve power.

In some implementations, a non-transitory computer-readable medium storing executable instructions that, when executed by one or more processors of a network base station, can cause the network base station to monitor a physical uplink control channel (PUCCH) for hybrid automatic repeat request (HARQ) information, receive a negative acknowledgement (NACK) message from a user equipment (UE) via the PUCCH, and in response to receiving the NACK message, delay a HARQ retransmission for the UE such that the UE can remain inactive during an OFF duration of a connected mode discontinuous reception (C-DRX) cycle of the UE.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

DETAILED DESCRIPTION

Figure 1:
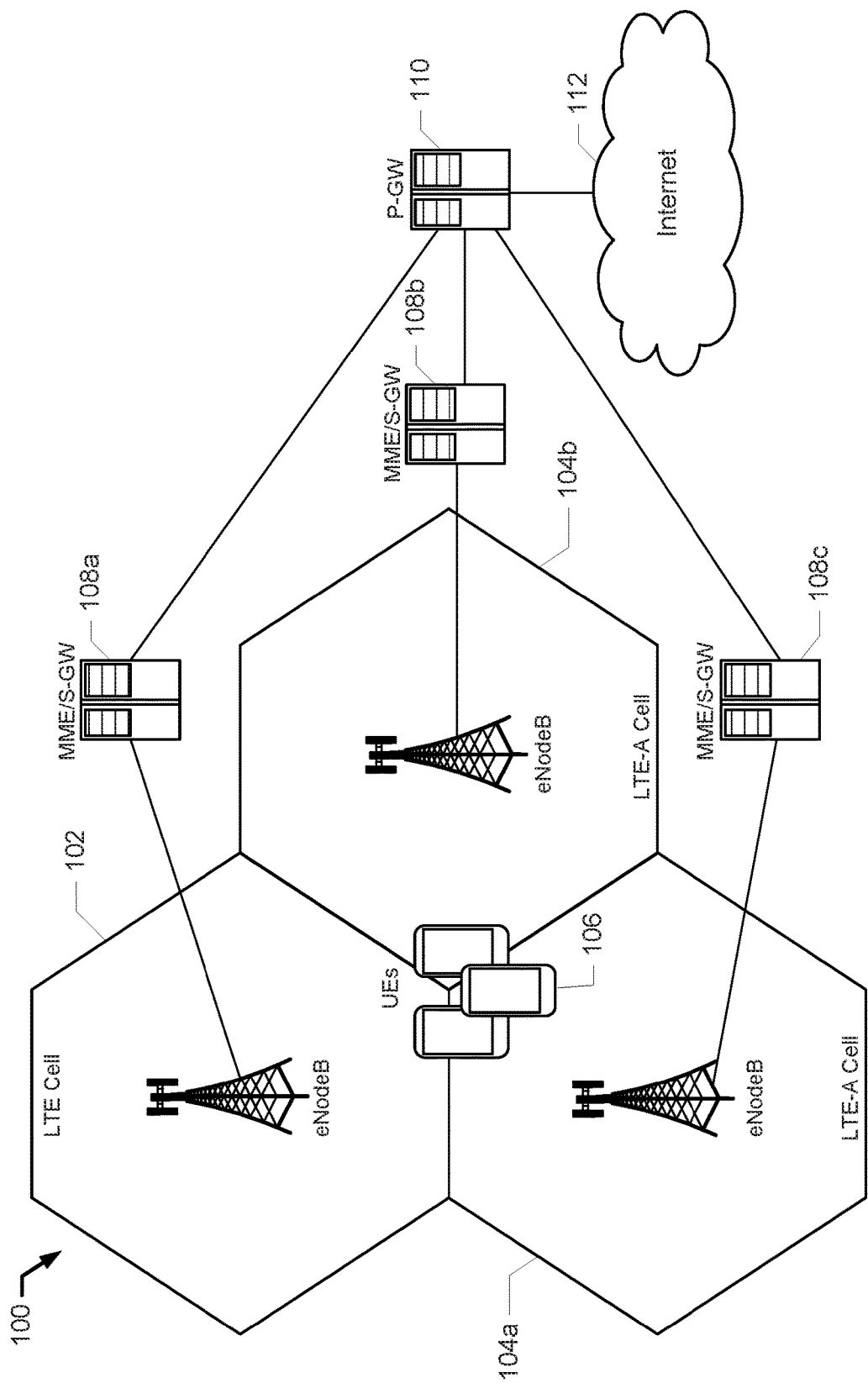
FIG. 1 illustrates a wireless communication system including Long Term Evolution (LTE) and LTE Advanced (LTE-A) network cells supporting multiple user equipment devices (UEs) that may be configured to employ advanced hybrid automatic repeat request (HARQ) functions, in accordance with some embodiments of the disclosure.

Representative examples for scheduling and implementing improved LTE downlink (DL) and LTE uplink (UL) hybrid automatic repeat request (HARQ) retransmissions, for respectively performing reduced HARQ operations in the DL and reduced HARQ operations in the UL, are described within this section. Further, various examples for performing DL and UL HARQ bundled retransmissions are also described herein. These examples are provided to add context to, and to aid in the understanding of, the subject matter of this disclosure. It should be apparent to one having ordinary skill in the art that the present disclosure may be practiced with or without some of the specific details described herein. Further, various modifications and/or alterations can be made to the subject matter described herein, and illustrated in the corresponding figures, to achieve similar advantages and results, without departing from the spirit and scope of the disclosure.

References are made in this section to the accompanying figures, which form a part of the disclosure and in which are shown, by way of illustration, various implementations corresponding to the described embodiments herein. Although the embodiments of this disclosure are described in sufficient detail to enable one having ordinary skill in the art to practice the described implementations, it should be understood that these examples are not to be construed as being overly-limiting or all-inclusive.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

FIG. 1 depicts a wireless communication system 100 that is compliant with the 3GPP Evolved Universal Terrestrial Radio Access (E-UTRA) air interface, and includes, but is not limited to, one LTE network cell 102 and two LTE-A network cells 104a-b, respectively having enhanced NodeB (eNodeB) base stations that can communicate between and amongst each other via an X2 interface. Further, the E-UTRA compliant communication system 100 can include any number of mobility management entities (MMES) 108a-c, serving gateways (S-GWs) 108a-c, PDN gateways (P-GWs) 110, etc., which, as part of the evolved packet core (EPC), can communicate with any of the LTE and LTE-A cell eNodeBs, 102 and 104a-b, via an S1 interface. Additionally, the EUTRA communication system 100 can include any number of UEs that may be provided wireless communications service by one or more of the eNodeBs of the LTE and LTE-A cells, 102 and 104a-b, at any particular time.

By way of example, a UE 106 may be located within an LTE-A cell 104a-b and in an LTE radio resource control (RRC) Connected mode when it initiates a voice over LTE (VoLTE) application to establish a voice call. The UE 106 running the VoLTE application can place a VoLTE voice call to an intended recipient by communicating voice data to a serving eNodeB 104a-b, which forwards the call through the EPC, 108a-c and 110, and thereby connects to the Internet 112 to transfer the VoLTE communications through an IP Multimedia Subsystem (IMS) network between the caller UE 106 and a receiving device of the intended recipient, which may be a part of a remote network. Alternatively, the UE 106 can initiate any number of different UE-resident applications that may be respectively associated with a particular data type, e.g., streaming audio data, streaming audio-video data, website data, text data, etc., to attempt to transfer IP-based application data via its serving LTE network 104a-b over the Internet 112.

Depending on the data type of a corresponding UE application, a network resource requirement (e.g., associated with network resource blocks or RBs) for communicating the application data may be minimal (e.g., for text or voice data), moderate (e.g., for website webpage data), or substantial (e.g., for streaming audio-video data). Consequently, in some embodiments, a first UE application may be associated with a low-bandwidth data type (e.g., VoLTE-type data); whereas, in other embodiments, a second UE application may be associated with a moderate to high-bandwidth data type (e.g., streaming audio or video data). In some implementations, various improved LTE DL and LTE UL HARQ retransmissions can be employed for respectively performing reduced HARQ operations that minimize communications overhead and UE 106 power consumption when a UE 106 is actively engaged in a VoLTE voice call that is communicated between the UE 106 and an eNodeB of an LTE or an LTE-A cell, 102 and 104a-b, e.g., at a time when the UE 106 or the eNodeB receives a corresponding error packet or transmission error.

In various embodiments, the improved DL HARQ retransmission procedures and/or the improved UL HARQ retransmission procedures can be employed in such a manner to substantially mitigate problems associated with unnecessary power consumption at a UE 106. This unnecessary power consumption can occur when the UE 106 attempts to monitor and/or decode various LTE communication channels for UL or DL HARQ messages and/or DL/UL transmissions during an LTE RRC Connected mode. In some implementations, these LTE communications channels may include, but are not limited to: the physical downlink control channel (PDCCH), the physical uplink control channel (PUCCH), the physical downlink shared channel (PDSCH), the physical uplink shared channel (PUSCH), the physical hybrid ARQ indicator channel (PHICH), etc. As will be described further herein, the various DL LTE HARQ retransmission procedures, as well as the, various UL LTE HARQ retransmission procedures can occur in conjunction with one or more connected mode discontinuous reception (C-DRX) operations and/or in conjunction with one or more semi-persistent scheduling (SPS) operations in a manner that increase UE 106 sleep durations in the presence of HARQ signaling.

Figure 2:
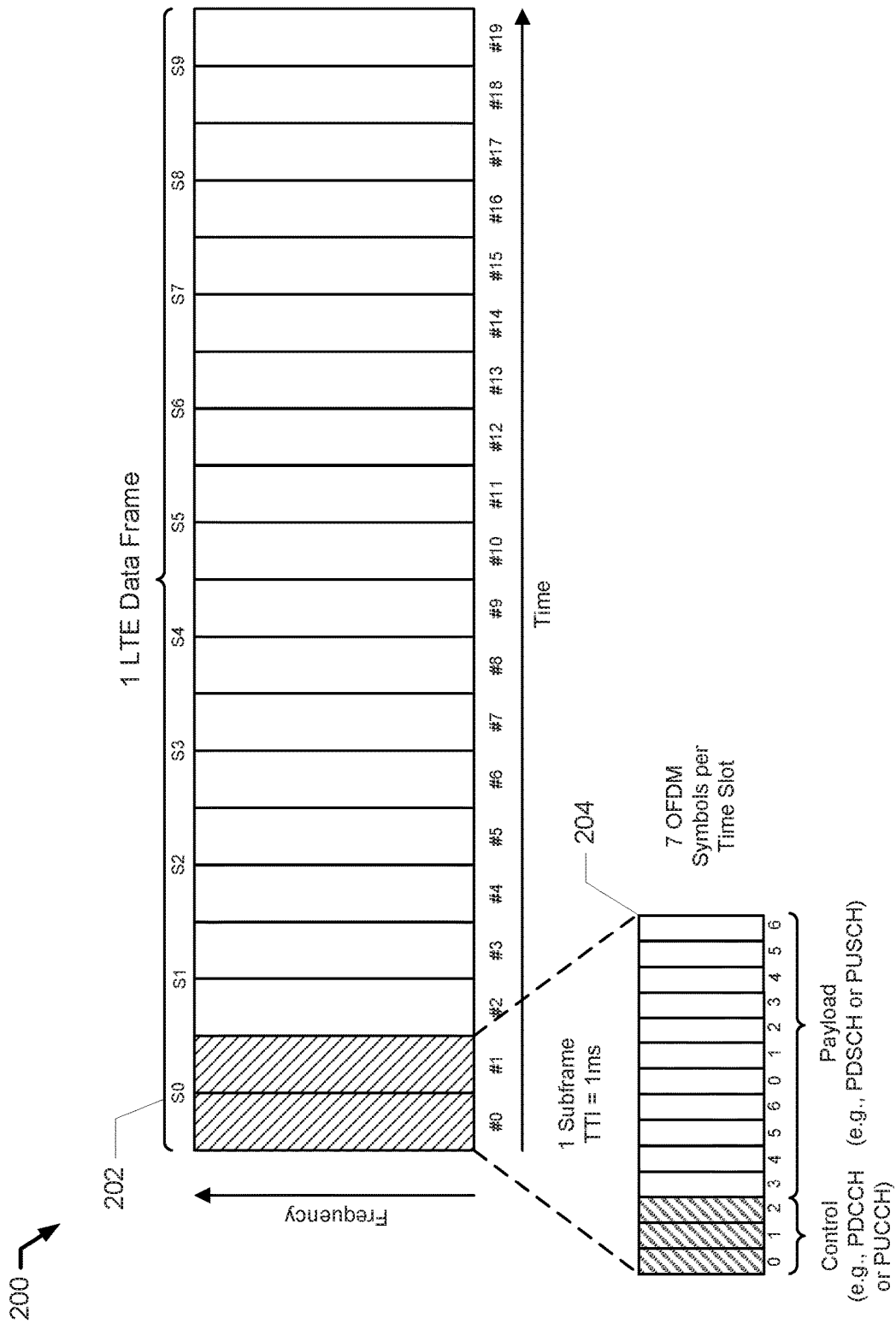
FIG. 2 illustrates a block diagram depicting a single LTE or LTE-A data frame structure, in accordance with various implementations of the disclosure.

FIG. 2 illustrates a block diagram 200 depicting a single LTE data frame structure 202 in accordance with various implementations of the disclosure. As would be understood by those skilled in the art, one LTE data frame 202 includes 10 subframes, labeled S0 through S9, respectively having a transmission time interval (TTI) of 1 ms. each. Each LTE subframe is composed of two time slots having a TTI of 0.5 ms. each. Accordingly, there are 20 time slots, labeled #0 through #19, within each LTE data frame 202. For instance, the first subframe S0 204 of the LTE data frame 202 may be composed of 14 orthogonal frequency division multiplexing (OFDM) symbols, which equates to 7 OFDM symbols per time slot, #0 and #1 , of subframe S0 204.

A first portion of the OFDM symbols (e.g., the first three OFDM symbols) of subframe S0 204 may be designated for control signaling information (e.g., control information associated with the PDCCH, the PUCCH, the PHICH, etc.), and the remaining portion of the OFDM symbols of subframe S0 204 may be designated for payload data (e.g., payload data associated with the PDSCH or the PUSCH). It should be understood that the number of OFDM symbols in each of the LTE subframes, S0 through S9, can vary depending on a length of a corresponding cyclic prefix (CP). The CP can be transmitted before each OFDM symbol in each subcarrier in the time domain to prevent inter-symbol interference (ISI) due to multipath.

In LTE, the CP may correspond to either a normal CP having a duration of 5 µs., or an extended CP having a duration of 17 µs. Therefore, an LTE slot employing a normal CP will typically have 7 OFDM symbols; whereas, an LTE slot employing an extended CP (e.g., intended for use in larger suburban cells) will typically have 6 OFDM symbols. An LTE resource block (RB) is typically associated with 12 OFDM subcarriers transmitting for the duration of one LTE slot. Accordingly, a normal RB (associated with a normal CP) transmitting for 0.5 ms. will comprise 84 OFDM symbols (12 subcarriers×7 OFDM symbols) or resource elements (REs). Likewise, an extended RB (associated with an extended CP) transmitting for 0.5 ms. will comprise 72 REs (12 subcarriers×6 OFDM symbols).

In various embodiments, an LTE-A cell 104*a-b* may employ multiple component carriers (CCs), in aggregate, to achieve cumulative bandwidths of up to 100 MHz within various allocated network spectrum bands. A corresponding LTE-A cell may comprise an eNodeB that can designate a PDCCH format or a PUCCH format according to its respective control information, which can be directed at a single UE 106 or multiple UEs 106 residing within the same network cell 104*a-b*. By way of example, PDCCH DCI may be associated with a cell radio network temporary identifier (C-RNTI) directed at a single UE 106, or alternatively, PDCCH DCI may be associated with a paging RNTI (P-RNTI) or a system information RNTI (SI-RNTI) directed at a group of UEs 106 located within the same cell 104*a-b*. In various embodiments, the DCI of a PDCCH may include downlink (DL) grant information (e.g., resource allocations of the PDSCH), as well as, uplink resource grant information (e.g., resource allocations of the PUSCH), Tx power control information, etc.

Figure 3:
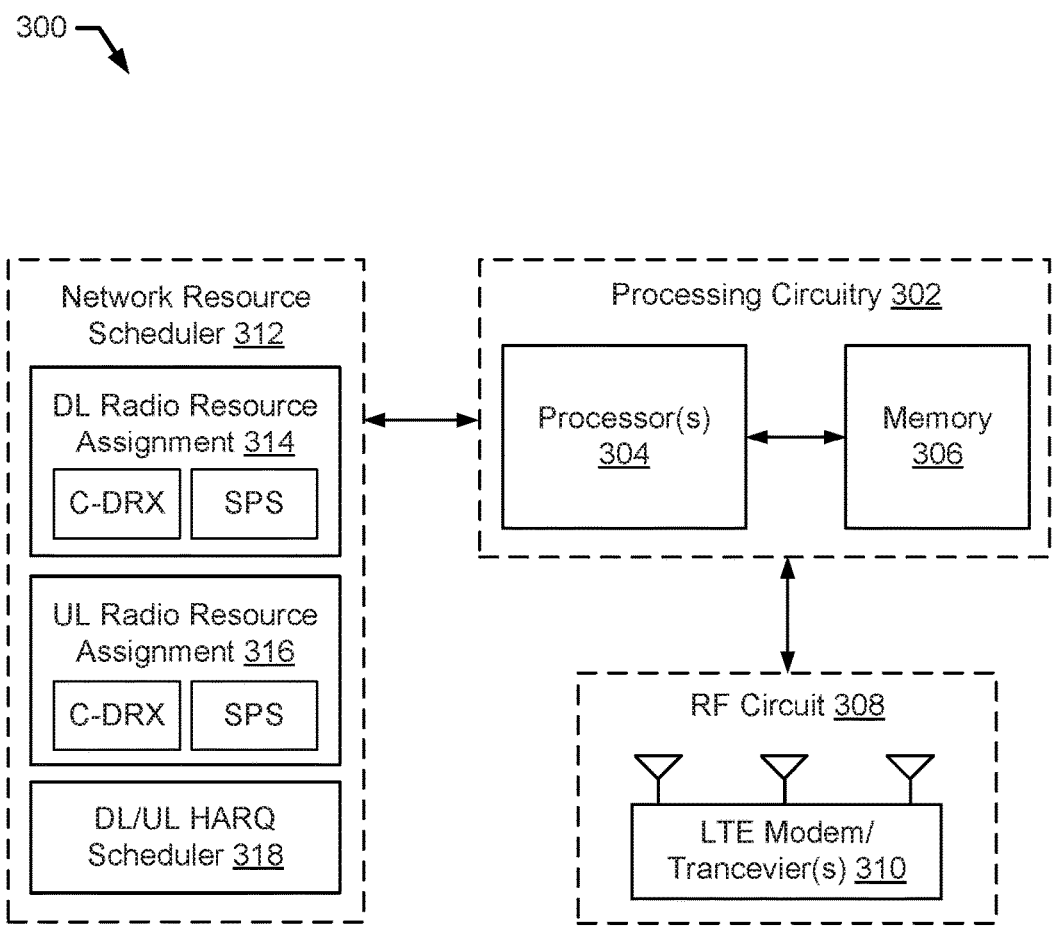
FIG. 3 illustrates a block diagram of a network apparatus including a network resource scheduler having a downlink (DL) radio resource assignment component, an uplink (UL) radio resource assignment component, and an DL/UL HARQ scheduler component, in accordance with some embodiments.

FIG. 3 illustrates a block diagram of a network apparatus 300 (e.g., an LTE eNodeB having RRC functionality) with a network resource scheduler 312 having a DL radio resource assignment component 314, an UL radio resource assignment component 316, and a DL/UL HARQ scheduler 318, in accordance with various embodiments of the disclosure. In some implementations, the network resource scheduler 312 can be configured to utilize its DL radio resource assignment component 314 to generate and/or issue various DL radio resource assignments (e.g., carrier DL RB grants) to one or more UEs 106 located within its corresponding network cells (e.g., within an LTE cell 102 or within an LTE-A cell 104*a-b*). Further, either of the DL radio resource assignment component 314 or the UL radio resource assignment component 316 may be capable of employing SPS and/or C-DRX processes, as described further herein.

In other situations, the network resource scheduler 312 can also be configured to utilize its UL radio resource assignment component 314 to generate and/or issue various UL radio resource assignments (e.g., carrier UL RB grants) to one or more UEs 106 located within its corresponding network cells (e.g., within an LTE cell 102 or within an LTE-A cell 104*a-b*). In this context, the network resource scheduler 312 of the network apparatus 300 may be able to determine which UEs 106 should receive PDCCH, PUCCH, PDSCH, PUSCH, and PHICH HARQ transmissions, and on what RBs these HARQ transmissions should be received during a respective TTI in the DL or in the UL.

Further, the network resource scheduler's 312 DL/UL HARQ scheduler component 318 may be configured to schedule and/or implement various improved DL HARQ procedures for performing reduced HARQ operations in the DL, as well as, various improved UL HARQ procedures for performing reduced HARQ operations in the UL. The functionality of DL/UL HARQ scheduler 318 will be described further herein with respect to the subject matter of FIGS. 5-15. Accordingly, one skilled in the art would be able to readily discern which HARQ scheduling processes may be carried out by the network apparatus 300 (e.g., an eNodeB having RRC functionality) acting alone, as well as, which DL HARQ implementations and which UL HARQ implementations can be carried out by the network apparatus 300 acting in collaboration with one or more UEs 106.

In some configurations, the network apparatus 300 can include processing circuitry 302 that can perform various HARQ resource scheduling actions in accordance with one or more embodiments disclosed herein. In this regard, the processing circuitry 302 can be configured to perform and/or control performance of one or more functionalities of the network apparatus 300 in accordance with various implementations, and thus can provide functionality for performing reduced HARQ operations in the DL, reduced HARQ operations in the UL, as well as, other communication procedures of the network apparatus 300 in accordance with various embodiments. The processing circuitry 302 may further be configured to perform data processing, application execution and/or other control and management functions according to one or more embodiments of the disclosure.

The network apparatus 300, or portions or components thereof, such as the processing circuitry 302, can include one or more chipsets, which can respectively include any number of coupled microchips thereon. The processing circuitry 302 and/or one or more other components of the network apparatus 300 may also be configured to implement functions associated with various reduced HARQ operations in the DL and various reduced HARQ operations in the UL, in accordance with various embodiments of the disclosure using multiple chipsets. In some scenarios, the network apparatus 300 may be associated with or employed as an eNodeB of an LTE 102 or an LTE-A cell 104*a-b* to operate within the wireless communication system 100 of FIG. 1. In this implementation, the network apparatus 300 may include one or more chipsets configured to enable the apparatus to operate within the wireless communication system 100 as a network base station, providing wireless communications service to any number of UEs 106 located within its corresponding wireless coverage area, e.g., a coverage area associated with either an LTE 102 or an LTE-A network cell 104*a-b*.

In some scenarios, the processing circuitry 302 of the network apparatus 300 may include one or more processor(s) 304 and a memory component 306. The processing circuitry 302 may be in communication with, or otherwise coupled to, a radio frequency (RF) circuit 308 having an LTE compliant modem and one or more wireless communication transceivers 310. In some implementations, the RF circuit 308 including the modem and the one or more transceivers 310 may be configured to communicate using different LTE RAT types. For instance, in some embodiments the RF circuit 308 may be configured to communicate using an LTE RAT, and in other embodiments, the RF circuit 308 may be configured to communicate using an LTE-A RAT.

In various implementations, the processor(s) 304 may be configured and/or employed in a variety of different forms. For example, the processor(s) 304 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 304 can be coupled to and/or configured in operative communication with each other and these components may be collectively configured to perform one or more procedures of the network apparatus 300 as described herein in the form of an eNodeB having RRC control functionality.

In some scenarios, the processors 304 can be configured to execute instructions that may be stored in the memory 306 or that can be otherwise accessible to the processors 304 in some other device memory. As such, whether configured as, or in conjunction with, hardware or a combination of hardware and software, the processors 304 of the processing circuitry 302 may be capable of performing operations according to various implementations described herein when configured accordingly.

In various embodiments, the memory 306 of the processing circuitry 302 may include multiple memory devices that can be associated with any common volatile or non-volatile memory type. In some scenarios, the memory 306 may be associated with a non-transitory computer-readable storage medium that can store various computer program instructions which may be executed by the processor(s) 304 during normal program executions. In this regard, the memory 306 can be configured to store information, data, applications, instructions, or the like, for enabling the network apparatus 300 to carry out various functions in accordance with one or more embodiments of the disclosure. In some implementations, the memory 306 may be in communication with, and coupled to, the processor(s) 304 of the processing circuitry 302, as well as one or more system buses for passing information between and amongst the different device components of the network apparatus 300.

It should be appreciated that not all of the components, device elements, and hardware illustrated in and described with respect to the network apparatus 300 of FIG. 3 may be essential to this disclosure, and thus, some of these items may be omitted, consolidated, or otherwise modified within reason. Additionally, in some implementations, the subject matter associated with the network apparatus 300 can be configured to include additional or substitute components, device elements, or hardware, beyond those that are shown within FIG. 3.

Figure 4:
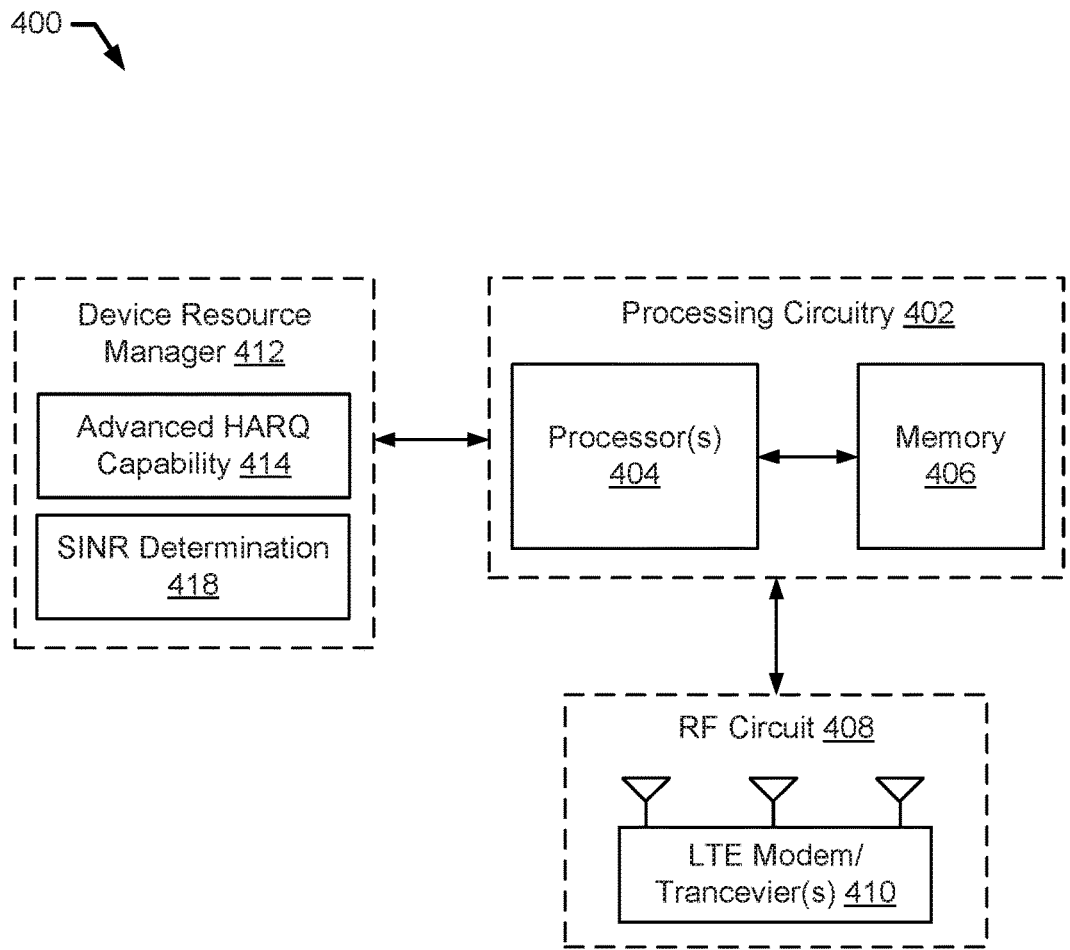
FIG. 4 illustrates a block diagram of a wireless communication device including a device resource manager having an advanced HARQ capability component and an SNR determination component, in accordance with some implementations of the disclosure.

FIG. 4 illustrates a block diagram of a communication device 400 (e.g., an LTE or LTE-A compliant UE) including an RF circuit 408 having one or more transceiver(s) and an LTE modem 410, as well as, a device resource manager 412 including an advanced HARQ capability component 414 and a signal to interference plus noise ratio (SINR) determination component 418, in accordance with some embodiments of the disclosure, which will be described further herein. In various configurations, the communication device 400 can include processing circuitry 402 that can perform various reduced HARQ operations in the DL, as well as, various reduced HARQ operations in the UL.

Further, the processing circuitry 402 of the communication device 400 can employ the advanced HARQ capability component 414 to perform advanced HARQ capability signaling to a network apparatus 300 (e.g., an eNodeB) in accordance with various embodiments. The advanced HARQ capability signaling procedures will become more apparent after reviewing the ensuing descriptions associated with the procedures of FIGS. 8-13. In some configurations, the processing circuitry 402 of the communication device 400 can employ the SINR determination component 418 to measure various network radio operating conditions and report these measurements or a dynamically determined SINR to an eNodeB 300 (having RRC functionality) to allow the eNodeB 300 to evaluate the SINR conditions associated with one or more UEs 400 to determine how to implement corresponding reduced HARQ retransmissions, in accordance with other embodiments, which will be describe further herein with respect to FIGS. 8-13.

In this regard, the processing circuitry 402 can be configured to perform and/or control performance of one or more functionalities of the communication device 400 in accordance with various implementations, and thus, the processing circuitry 402 can provide functionality for performing one or more DL HARQ and/or UL HARQ processes (in conjunction with optional signaling form a network apparatus 300), in accordance with various scenarios that are described further herein. The processing circuitry 402 may further be configured to perform data processing, application execution and/or other control and management functions according to one or more embodiments of the disclosure.

The communication device 400, or portions or components thereof, such as the processing circuitry 402, can include one or more chipsets, which can respectively include any number of coupled microchips thereon. The processing circuitry 402 and/or one or more other components of the communication device 400 may also be configured to implement functions associated with various device power conservation procedures of the disclosure using multiple chipsets. In some scenarios, the communication device 400 may be associated with or employed as a multi-mode UE 106 of an LTE 102 or an LTE-A cell 104*a-b* to operate within the wireless communication system 100 of FIG. 1. In this implementation, the communication device 400 may include one or more chipsets configured to enable the apparatus to communicate within the LTE or LTE-A cells, 102 and 104*a-b*, of the wireless communication system 100.

In various scenarios, the processing circuitry 402 of the communication device 400 may include one or more processor(s) 404 and a memory component 406. The processing circuitry 402 may be in communication with, or otherwise coupled to, a radio frequency (RF) circuit 408 having an LTE compliant modem and one or more wireless communication transceivers 410. In some implementations, the RF circuit 408 including the modem and the one or more transceivers 410 may be configured to communicate using different LTE RAT types. For instance, in some embodiments the RF circuit 408 may be configured to communicate using an LTE RAT, and in other embodiments, the RF circuit 408 may be configured to communicate using an LTE-A RAT.

In some embodiments, the processor(s) 404 may be configured in a variety of different forms. For example, the processor(s) 404 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 404 of the communication device 400 can be coupled to and/or configured in operative communication with each other, and these components may be collectively configured to perform one or more procedures of the communication device 400 as described herein in the form of an LTE compliant UE 106.

In some implementations, the processors 404 can be configured to execute instructions that may be stored in the memory 406 or that can be otherwise accessible to the processors 404 in some other device memory. As such, whether configured as, or in conjunction with, hardware or a combination of hardware and software, the processors 404 of the processing circuitry 402 may be capable of performing operations according to various implementations described herein when configured accordingly.

In various embodiments, the memory 406 of the processing circuitry 402 may include multiple memory devices that can be associated with any common volatile or non-volatile memory type. In some scenarios, the memory 406 may be associated with a non-transitory computer-readable storage medium that can store various computer program instructions which may be executed by the processor(s) 404 during normal program executions. In this regard, the memory 406 can be configured to store information, data, applications, instructions, or the like, for enabling the communication device 400 to carry out various functions in accordance with one or more embodiments of the disclosure. In some implementations, the memory 406 may be in communication with, and coupled to, the processor(s) 404 of the processing circuitry 402, as well as one or more system buses for passing information between and amongst the different device components of the communication device 400.

It should be appreciated that not all of the components, device elements, and hardware illustrated in and described with respect to the communication device 400 of FIG. 4 may be essential to this disclosure, and thus, some of these items may be omitted, consolidated, or otherwise modified within reason. Additionally, in some implementations, the subject matter associated with the communication device 400 can be configured to include additional or substitute components, device elements, or hardware, beyond those depicted within FIG. 4.

Figure 5:
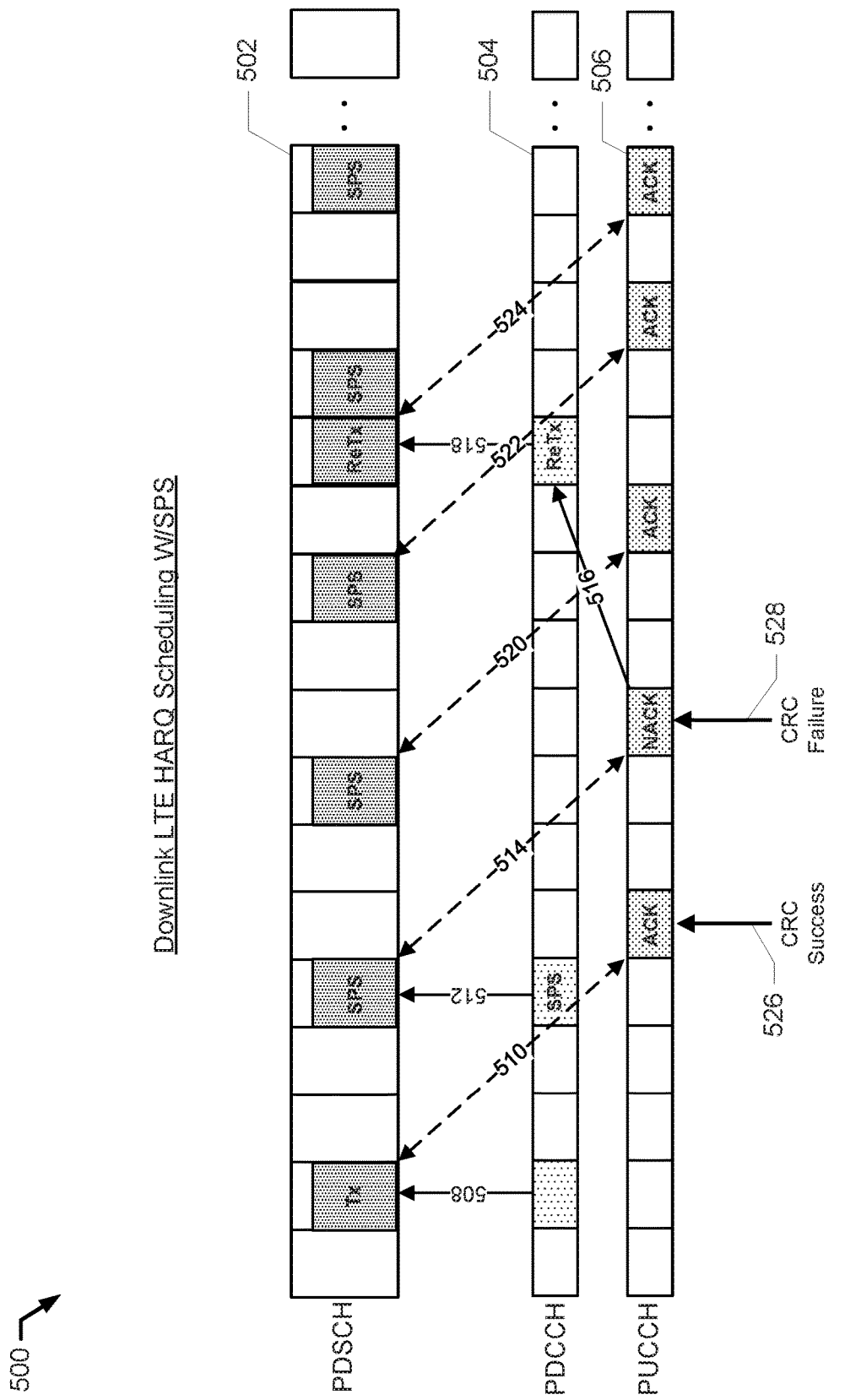
FIG. 5 illustrates a block diagram depicting DL HARQ scheduling procedures in conjunction with semi-persistent scheduling (SPS) procedures for LTE DL communications, in accordance with some embodiments.

FIG. 5 illustrates a block diagram depicting DL HARQ scheduling 500 occurring in conjunction with SPS procedures for LTE communications (e.g., VoLTE communications), according to some embodiments of the disclosure. It should be understood that in various embodiments, the DL LTE HARQ processes 500 shown in FIG. 5 may also occur in conjunction with various C-DRX power savings operations. In general, LTE HARQ processes can be performed by an eNodeB 300 in conjunction with a UE 400 to attempt to retransmit failed transport block (TB) communications in the DL and/or in the UL.

As would be understood by those skilled in the art, SPS routines may be employed by a network resource scheduler 312 of a network apparatus 300 (e.g., an eNodeB having RRC functionality) to reduce control channel signaling requirements for a UE 400 communicating periodic application data having a relatively low duty cycle, such as VoLTE-type application data. In this manner, control signaling overhead relating to DL and/or UL resource assignments for a single UE or a group of UEs 400, which would typically be communicated via the PDCCH, may be significantly reduced or eliminated for a period of time when SPS is active.

By way of example, in VoLTE communications a DL frame can occur every 10 to 20 ms., and as such, a significant amount of system bandwidth would be required to issue control signaling information for every VoLTE DL frame on a frame-by-frame basis. In this regard, SPS can allow a single SPS resource allocation for a UE 400 to persist for an unspecified duration, until modified or otherwise changed by a controlling network service provider entity 300. In some implementations, a resource allocation change that could overwrite an existing SPS allocation may be issued by a network apparatus 300 employing a network resource scheduler 312 (e.g., an eNodeB having RRC functionality), to instruct a UE 400 to again monitor a control channel (e.g., the PDCCH) for new resource allocations or grants. As noted above, SPS is configurable for both DL communications and UL communications; however, SPS is often more effectively employed in the DL, where control information overhead problems can be more pronounced.

The DL HARQ scheduling procedures 500 of FIG. 5 depict signaling interactions amongst the PDSCH 502, the PDCCH 504, and the PUCCH 506, during various DL HARQ processes. As would be understood by those skilled in the art, the PDCCH 504 may include downlink control information (DCI), e.g., control information emanating from an eNodeB, that informs a UE 400 of various DL resource allocations for the PDSCH 502, HARQ information relating to the PDSCH 502, various UL scheduling grants for the PUSCH 602, etc. The PUCCH 506 can carry DL HARQ acknowledgements (e.g., ACK/NACKs) that are transmitted by a UE 400 to a network apparatus 300 in response to the UE 400 receiving, or not receiving, various DL data transmissions via the PDSCH 502.

In some situations, a DL allocation 508 may be transmitted from a network apparatus 300 employing a network resource scheduler 312 having DL HARQ capability 318 (e.g., an eNodeB having RRC functionality) within the PDCCH 504 to a UE 400 to identify a particular set of designated DL resource blocks (RBs) where the UE 400 should attempt to decode the PDSCH 502 for DL information. Upon acquiring, or attempting to acquire, the identified DL information from the PDSCH 502 corresponding to the DL allocation 508, an intended recipient UE 400 can send a positive DL HARQ acknowledgement (ACK) message 510 or a negative DL HARQ acknowledgement (NACK) message 514 to the network apparatus 300 via the PUCCH 506.

The DL HARQ ACK/NACK acknowledgements can indicate to the network apparatus 300 (e.g., an eNodeB having RRC functionality) whether or not the DL information was received or acquired by the UE 400 and/or whether DL information that was acquired by the UE 400 is free from errors, e.g., according to a cyclic redundancy check (CRC) result, 526 or 528. In some scenarios, a DL CRC success result 526 can indicate that DL information was acquired by a UE 400 without error or that scheduled DL information was received by the UE 400 with minimal error, in accordance with a predetermined error tolerance threshold (e.g., a CRC threshold designated by an eNodeB 300).

Alternatively, a DL CRC failure result 528 may indicate that scheduled DL information was not acquired by a UE 400, or that scheduled DL information was acquired by the UE 400, but that the acquired DL information contains errors that exceed a predetermined error tolerance threshold (e.g., a CRC threshold designated by an eNodeB). As would be understood by those skilled in the art, a UE 400 will typically issue a DL HARQ ACK message to a network apparatus 300 (e.g., an eNodeB) via the PUCCH 506 in response to receiving a DL CRC success result 526. Likewise, a UE 400 will typically issue a DL HARQ NACK message to a network apparatus 300 (e.g., an eNodeB) in response to receiving a DL CRC failure result 528.

In accordance with the DL HARQ SPS example 500, an ongoing SPS DL resource allocation 512 may be sent by a network apparatus 300 employing the DL HARQ scheduler 318 (e.g., an eNodeB having RRC functionality) to a UE 400 to instruct the UE 400 to attempt to decode the PDSCH 502 for known, recurring DL information on a periodic basis (e.g., every 20 or 40 ms. for VoLTE data), such that the UE 400 is not required to further decode the PDCCH 504 until a change to the ongoing SPS allocation 512 is detected. Accordingly, at every designated SPS interval (e.g., every 20 or 40 ms.) a UE 400 can attempt to decode the PDSCH 502 for prescheduled DL information. Depending on whether or not the DL information has been successfully acquired by the UE 400 via the PDSCH 502 and/or whether or not the DL information was acquired without errors, the UE 400 can send a DL HARQ ACK message 510, 520, 522, and 524, or a DL HARQ NACK message 514 to the network apparatus 300 (e.g., an eNodeB) via the PUCCH 506.

In various implementations, upon receiving a DL HARQ NACK 514 message via the PUCCH 506 that indicates a DL transmission failure or error (e.g., corresponding to a CRC failure result 528), a network apparatus 300 employing the DL HARQ scheduler 318 (e.g., an eNodeB having RRC functionality) can attempt to retransmit the DL information and/or a portion of the DL information 516 to the UE 400 at a later time, in accordance with a designated retransmission interval/duration. In various scenarios, a total retransmission time or round trip time (RTT) for the UE 400 to receive the correct and/or complete DL information may be scheduled to occur within a particular number of TTIs to account for anticipated network communication and device processing delays.

In some scenarios, a network apparatus 300 employing the DL HARQ scheduler 318 can evaluate a DL HARQ NACK 514 received via the PUCCH 506 to determine when to schedule a DL retransmission 516 based on various network considerations, including an application data type being communicated in the DL. The UE 400 can thereafter be informed of the DL retransmission schedule 516 by receiving a supplemental DL allocation 518 for the retransmission within the PDCCH 504, as designated by the network apparatus 300 (e.g., an eNodeB having RRC functionality). As would be understood by those skilled in the art, this DL HARQ retransmission can occur on top of ongoing SPS operations, such that the DL HARQ procedures 500 requiring the UE 400 to decode the PDCCH 504 for retransmit control information will supersede SPS PDCCH "do not decode" durations (described above).

Notably, the designated DL RTT for DL HARQ operations 500 requires a UE 400 to expend local device resources (e.g., battery power, processing power, available memory, etc.) for an extended duration in order to reattempt acquiring the DL information from the PDSCH 502. When these DL HARQ procedures 500 occur during existing SPS power saving operations or during existing C-DRX power saving operations, the DL HARQ processes will interrupt a UE's 400 power conservation mode (e.g., a device sleep mode) by requiring the UE 400 to: identify a DL CRC failure event 528, respond to the network apparatus 300 (e.g., an eNodeB) with a DL HARQ NACK message 516 over the PUCCH 506, and then listen for DL retransmit (ReTx) control information 518 over the PDCCH 504, to be able to decode the PDSCH 502 for one or more DL retransmissions. During these DL HARQ processes, a UE 400 will typically need to remain awake for the entire duration of the designated DL HARQ RRT. Accordingly, by reducing DL HARQ procedures, a UE 400 will be able to remain asleep/inactive for longer periods of time during SPS power saving mode operations and/or C-DRX power saving mode operations.

Figure 6:
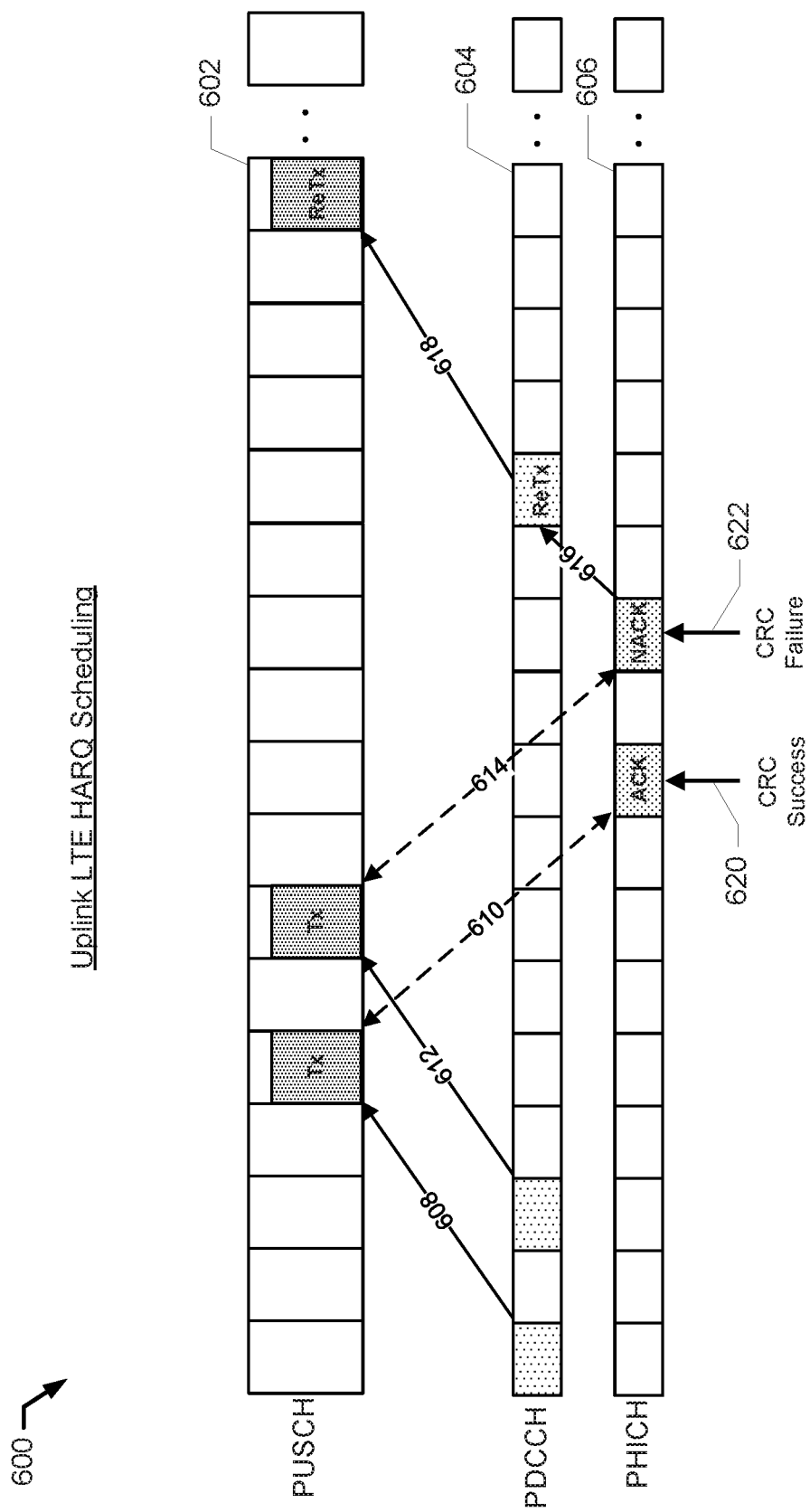
FIG. 6 illustrates a block diagram depicting UL HARQ scheduling procedures for LTE UL communications, in accordance with various embodiments of the disclosure.

FIG. 6 illustrates a block diagram depicting UL LTE HARQ scheduling procedures 600 in accordance with various embodiments of the disclosure. Although not depicted in FIG. 6, it should be understood that in some implementations UL HARQ processes 600 can occur in conjunction with SPS and/or C-DRX power saving routines. As described above, HARQ processes are configured to occur on top of SPS and C-DRX procedures, thereby preempting designated UE 400 power savings modes associated with SPS and/or C-DRX by requiring a UE 400 to remain awake long enough to perform requisite HARQ processing functions.

The UL HARQ scheduling procedures 600 of FIG. 6 depict signaling interactions amongst the PUSCH 602, the PDCCH 604, and the PHICH 606, during various UL HARQ processes. As would be understood by those skilled in the art, the PHICH 606 is configured to carry UL HARQ acknowledgements (e.g., ACK/NACKs) that can be transmitted by a network apparatus 300 (e.g., an eNodeB) in response to receiving, or not receiving, various expected UL data transmissions from a UE 400 that it provides LTE or LTE-A communications service to.

In some embodiments, an UL grant 608 may be transmitted from a network apparatus 300 employing a network resource scheduler 312 having UL HARQ capability 318 (e.g., an eNodeB having RRC functionality) within the PDCCH 604 to a UE 400 to identify a particular set of designated UL RBs where the UE 400 should attempt to transmit UL information to the network apparatus 300 in accordance with a predefined TTI interval (e.g., every 4 TTIs=4 ms.). In this configuration, there will be a TTI delay between a time when the UE 400 receives the UL grant 608 via the PDCCH 604 and a time when the UL RBs allocated to UE 400 for the UL transmission become available. The TTI delay is intended to give the UE 400 sufficient time to dequeue and determine how best to transmit a corresponding UL transport block (TB), e.g., in accordance with various network-designated quality of service (QoS) requirements.

Upon receiving, or attempting to receive, an UL transmission via the PUSCH 602 corresponding to an UL grant, 608 or 612, a recipient network apparatus 300 (e.g., an eNodeB) can transmit either a positive UL HARQ acknowledgement (ACK) message 610 or a negative UL HARQ acknowledgement (NACK) message 614 to the sending UE 400 via the PHICH 606, e.g., on the DL from the network apparatus 300. The UL HARQ ACK/NACK acknowledgements, 610 and 614, can indicate to the UE 400 whether or not an UL TB was received or acquired by the network apparatus 300 and/or whether information of the UL TB that was acquired by the network apparatus 300 is free from errors, e.g., according to a corresponding cyclic redundancy check (CRC) result, 620 or 622.

In various embodiments, an UL CRC success result 620 can indicate that the UL TB was received by the network apparatus 300 without error, or that the UL TB was received by the network apparatus 300 with minimal error. Alternatively, an UL CRC failure result 622 may indicate that the UL TB was not received by the network apparatus 300, or that the UL TB was received by the network apparatus 300, but that the received UL TB contains errors that exceed a predetermined threshold.

As would be understood by those skilled in the art, a network apparatus 300 (e.g., an eNodeB having RRC functionality) will typically issue an UL HARQ ACK message to a corresponding UE 400 via the PHICH 606 in response to an UL CRC success result 620. Similarly, a network apparatus 300 (e.g., an eNodeB having RRC functionality) will typically issue an UL HARQ NACK message to a UE 400 via the PHICH 606 in response to an UL CRC failure result 622.

In some implementations, upon receiving an UL HARQ NACK 614 via the PHICH 606 from a network apparatus 300 that indicates an UL transmission failure or error (e.g., corresponding to an UL CRC failure result 622), a UE 400 can attempt to retransmit the UL TB and/or a portion of the UL TB information 616 to the network apparatus 300 at a later time, in accordance with a designated retransmission interval (e.g., within 4TTIs=4 ms.). In various scenarios, a total retransmission time or round trip time (RTT) for the network apparatus 300 to receive the correct and/or complete UL TB from the UE 400 may be scheduled to occur within a designated number of TTIs associated with an UL HARQ RTT to account for anticipated network communication and device processing delays (e.g., an UL RTT of 8TTIs=8 ms.).

In various instances, a network apparatus 300 employing the UL HARQ scheduler 318 can evaluate a failed UL transmission (e.g., an UL CRC failure 622 corresponding the UL NACK message 614) to determine how and when to schedule an UL retransmission 616 based on various network considerations, including an application data type being communicated in the UL (e.g., a VoLTE application data type). The UE 400 can thereafter be informed of the UL retransmission allocation 616 by receiving a supplemental UL grant 618 for the UL retransmission within the PDCCH 604.

Similar to the DL HARQ procedures 500 described above with respect to FIG. 5, the UL HARQ procedures 600 can occur during existing SPS power saving operations or during existing C-DRX power saving operations. In these scenarios, the UL HARQ processes 600 will interrupt a UE's 400 power conservation mode (e.g., a device sleep mode) by requiring the UE 400 to listen for UL retransmit (ReTx) control information 618 on the PDCCH 604 to determine when to attempt to retransmit the information associated with the failed UL TB via the PUSCH 602. During these UL HARQ processes 600, a UE 400 will typically need to remain awake for the entire duration of a designated UL HARQ RRT. Accordingly, by reducing UL HARQ procedures, a UE 400 will be able to remain asleep/inactive for longer periods of time during SPS power saving mode operations and/or a C-DRX power saving mode operations.

Figure 7:
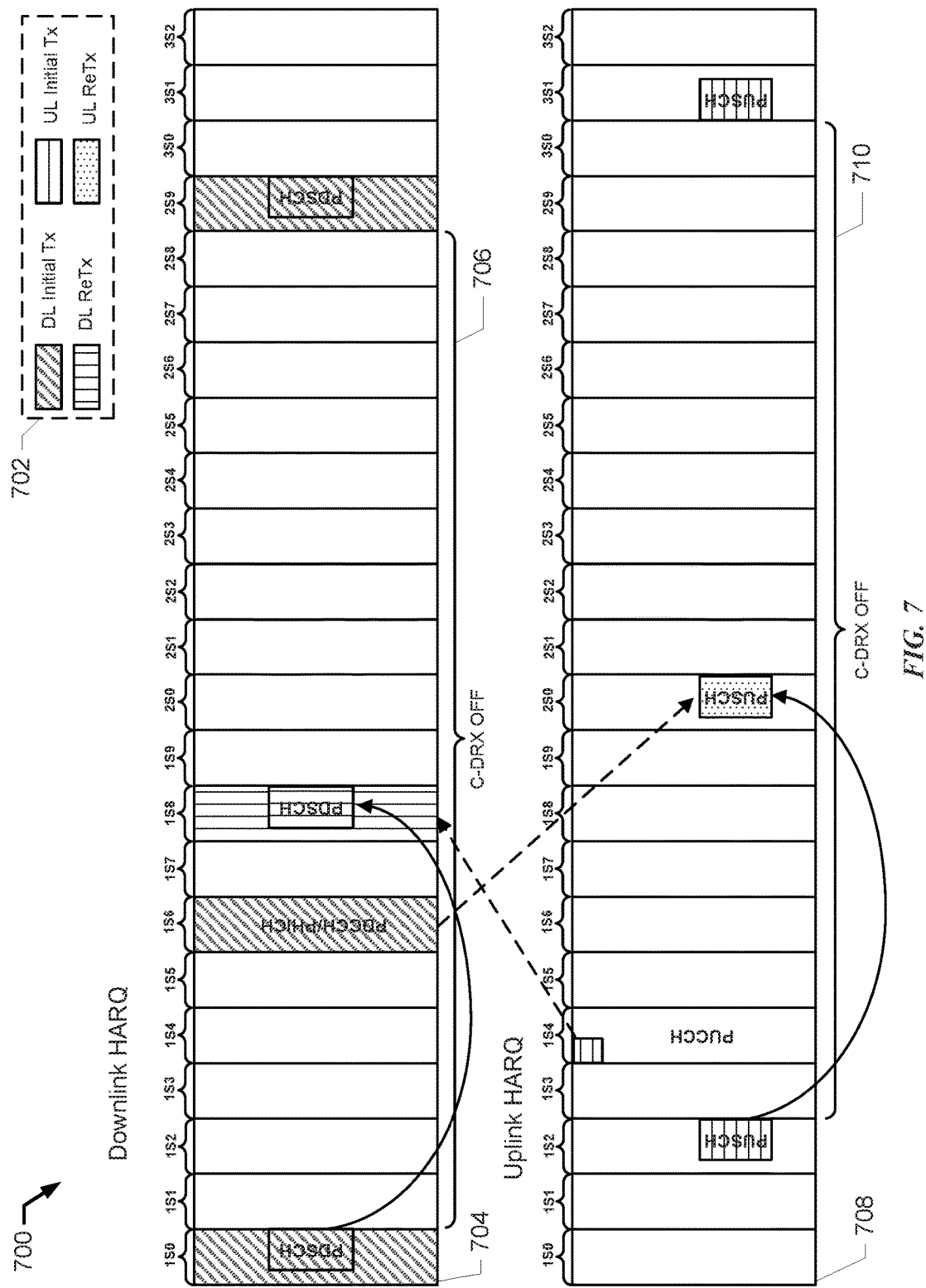
FIG. 7 illustrates a block diagram depicting synchronous DL LTE and UL LTE HARQ procedures, in accordance with various implementations of the disclosure.

FIG. 7 illustrates a simplified block diagram 700 depicting synchronous DL LTE 704 and UL LTE 708 HARQ procedures occurring, in part, during a C-DRX OFF duration, in accordance with various implementations of the disclosure. The synchronous HARQ procedures 700 represent HARQ communications between an eNodeB 300 and a UE 400 in accordance with some embodiments. It should be understood that, although the simplified block diagram 700 shows synchronous DL and UL HARQ procedures, without reference to any SPS procedures, these UE power conservation processes could be included within the context of the synchronous DL and UL HARQ procedures, 704 and 708, e.g., in a similar manner to that which was described above with respect to FIG. 5. The various transmission and retransmission communications of the DL HARQ 704 and UL HARQ 708 processes are represented within the shaded DL/UL communications key 702, which is provided herewith for reference.

During an initial TTI, associated with a first DL subframe (1S0), an eNodeB 300 can employ its DL radio resource assignment component 314 of its network resource scheduler 312 to transmit a first DL transmission to a corresponding UE 400 via the PDSCH. Four TTIs later, associated with a fifth UL subframe (1S4), a recipient UE 400 can send the eNodeB 300 a HARQ NACK message via the PUCCH to indicate that the first DL transmission was received with one or more errors. Thereafter, the eNodeB 300 can employ its DL HARQ scheduler 318 to process the received NACK message from the UE 400, and subsequently retransmit the failed DL transmission via the PDSCH at the ninth DL subframe (1S8), four TTIs later. Assuming these DL HARQ retransmission procedures occur during a C-DRX OFF duration 706, a corresponding UE 400 inactivity period (e.g., a UE C-DRX sleep mode) associated with the DL HARQ retransmission is shortened to accommodate for UE 400 DL HARQ processing (e.g., as represented by the empty DL subframes, from 1S9 through 2S8, over the duration of 10 TTIs).

In the uplink, a UE 400 can transmit a first UL transmission via the PUSCH to a corresponding eNodeB 300 at a third TTI associated with a third UL subframe (1S2). Four TTIs later, associated with a seventh DL subframe (1S6), a recipient eNodeB 300 can send the UE 400 a HARQ NACK message via the PHICH to indicate that the first UL transmission was received with one or more errors. Thereafter, the eNodeB 300 can employ its UL HARQ scheduler 318 to coordinate an UL retransmission with the UE 400 via the PDCCH, for the failed UL transmission, which can be scheduled to occur at the eleventh UL subframe (2S0), four TTIs later. Assuming these UL HARQ retransmission procedures occur during a C-DRX OFF duration 710, a corresponding UE 400 inactivity period (e.g., a UE C-DRX sleep mode) associated with the UL HARQ retransmission is shortened to accommodate for UE 400 UL HARQ processing (e.g., as represented by the empty UL subframes, from 2S1 through 3S0, over the duration of 10 TTIs).

Figure 8:
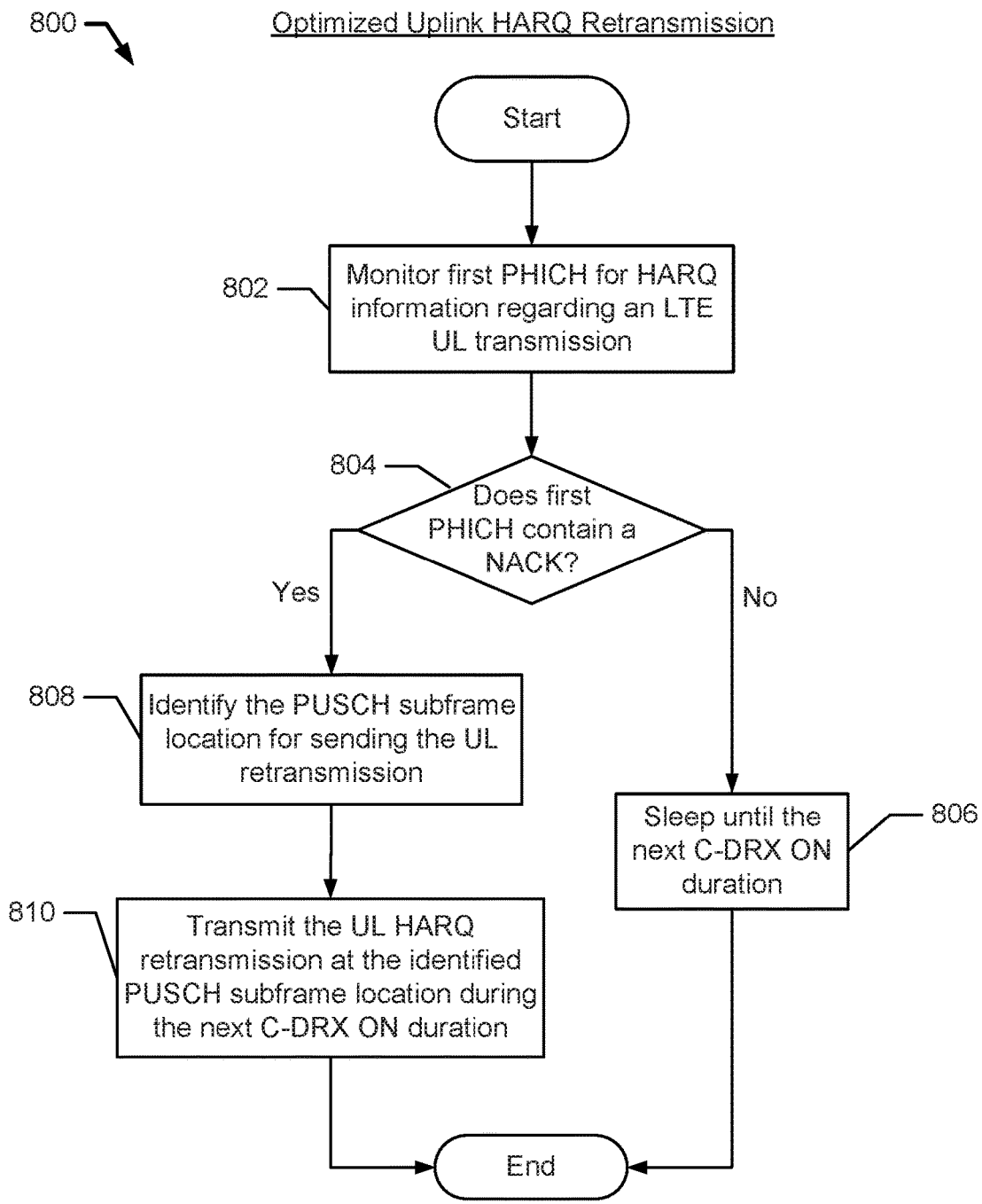
FIG. 8 illustrates a flowchart associated with example methods for performing an optimized UL LTE HARQ retransmission, in accordance with various embodiments.

FIG. 8 illustrates a flowchart associated with various procedures 800 for performing an optimized UL LTE HARQ retransmission, in accordance with various embodiments of the disclosure. In this regard, it should be understood that any or all of the procedures 800 depicted in FIG. 8 may be associated with a method, or methods, that can be implemented by the execution of computer program instructions stored on a non-transitory computer-readable memory 406 of a UE 400, in conjunction with the execution of computer program instructions stored on a non-transitory computer-readable memory 306 of an eNodeB 300.

Initially, at operation block 802, after an initial UL transmission over the PUSCH, a sender UE 400 having advanced HARQ capability 414 can monitor only the first PHICH for associated HARQ ACK/NACK information sent from the recipient eNodeB 300, relating to its initial UL transmission. Subsequently, at decision block 804, the UE 400 can determine if the first PHICH received from the eNodeB 300 contains a HARQ NACK message, which indicates that the initial UL transmission over the PUSCH was received with one or more errors. In a scenario where the UE 400 determines that the PHICH contains a HARQ ACK message, as opposed to a HARQ NACK message, that indicates that the first UL transmission was successfully received by the eNodeB 300, the UE 400 can be configured to enter into a power saving mode, at operation block 806, such that the UE 400 will sleep until the next C-DRX ON duration.

Alternatively, in a scenario where the UE 400 determines that the PHICH contains a HARQ NACK message that indicates that the first UL transmission was received with one or more errors by the eNodeB 300, the UE 400 can be configured to identify a subframe location where to decode the PUSCH for the UL HARQ retransmission, e.g., after decoding a corresponding PDCCH from the eNodeB 300 comprising ReTx control information, at operation block 808. Subsequently, the UE 400 can transmit the corresponding UL HARQ retransmission to the eNodeB 300 via the PUSCH at the identified PUSCH subframe location, during the next C-DRX ON duration. In this manner, the UE 400 can conserve power by only monitoring a single PHICH for HARQ ACK/NACK information during a C-DRX OFF duration, to thereby increase the number of TTIs that the UE can remain inactive during the C-DRX OFF duration.

Figure 9:
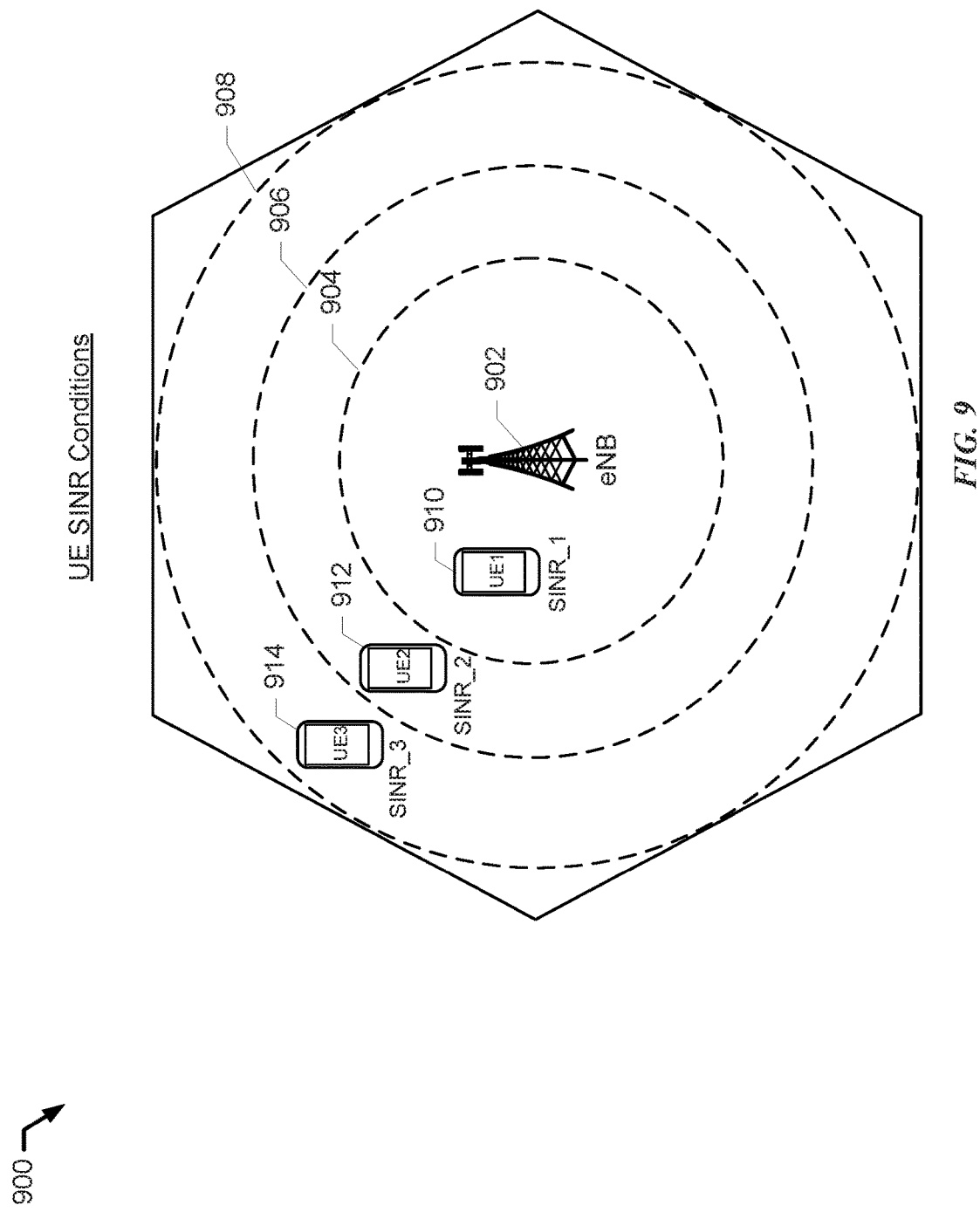
FIG. 9 illustrates a network diagram depicting a single LTE or LTE-A cell wherein an eNodeB base station is in communication with user equipment devices (UEs) respectively experiencing different Signal to Interference plus Noise Ratio (SINR) conditions, in accordance with some embodiments of the disclosure.

FIG. 9 illustrates a network diagram depicting a single LTE or LTE-A cell 900 wherein an eNodeB base station 902 is in communication with multiple UEs, 910, 912, and 914, that respectively experience different SINR conditions (e.g., SINR_1, SINR_2, and SINR_3), in accordance with some embodiments of the disclosure. As would be understood by those skilled in the art, a first UE 910 communicating within a first coverage region 904 that is close to the location of the eNodeB 902 will typically experience good SINR conditions (e.g., high Rx power, low noise, and potentially low signal interference). Similarly, a second UE 912 communicating within a second coverage region 906 that is further away from the location of the eNodeB 902 (e.g., within the middle of the LTE cell 900) will typically experience moderate SINR conditions (e.g., medium Rx power, increased noise, and potentially increased signal interference), with respect to the conditions experienced by the first UE 910.

Likewise, a third UE 914 communicating within a third coverage region 908 that is even further away from the location of the eNodeB 902 (e.g., near and edge or periphery region of the LTE cell 900) will typically experience poor SINR conditions (e.g., low Rx power, high noise, and potentially high signal interference), with respect to the conditions experienced by the first UE 910 and the second UE 912. As will be described further herein, depending on whether a respective UE, 910, 912, or 914, experiences good (SINR_1), moderate (SINR_2), or poor (SINR_3) SINR conditions within the different coverage regions, 904, 906, or 908, of the LTE cell 900, it may be beneficial for the eNodeB 902 to preemptively schedule one or more bundled DL/UL HARQ retransmissions, to improve the likelihood of HARQ retransmission success, and to further reduce a number of consecutive TTIs when a UE 400 must remain awake to process HARQ signaling and HARQ retransmissions during various C-DRX OFF durations.

Figure 10:
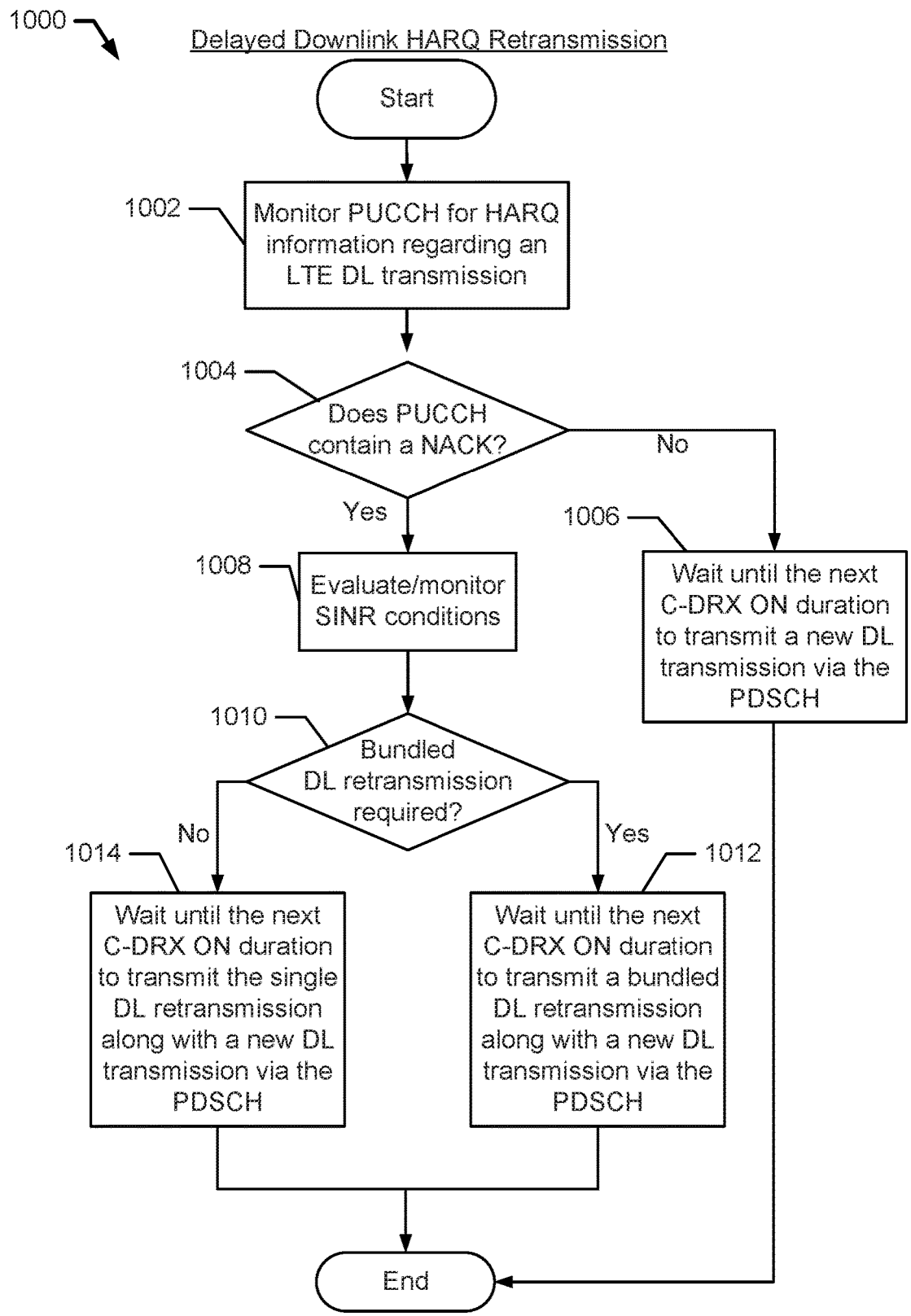
FIG. 10 illustrates a flowchart associated with example methods for performing delayed DL LTE HARQ retransmissions, in accordance with various embodiments.

FIG. 10 illustrates a flowchart associated with various procedures 1000 for performing delayed DL LTE HARQ retransmissions, in accordance with various embodiments of the disclosure. In this regard, it should be understood that any or all of the procedures 1000 depicted in FIG. 10 may be associated with a method, or methods, that can be implemented by the execution of computer program instructions stored on a non-transitory computer-readable memory 306 of an eNodeB 300, in conjunction with the execution of computer program instructions stored on a non-transitory computer-readable memory 406 of a UE 400.

Initially, at operation block 1002, during LTE DL communications between an eNodeB 300 and a UE 400, the eNodeB 300 employing its DL HARQ scheduler component 318 of its network resource scheduler 312 can be configured to monitor the PUCCH for HARQ acknowledgement information (e.g., ACK/NACKs) following to a particular DL transmission. Next, at decision block 1004, the eNodeB 300 will determine whether or not the corresponding PUCCH contains a HARQ NACK message emanating from the UE 400. In a scenario where the PUCCH contains an ACK message, as opposed to a NACK message, which indicates that the DL transmission was successfully received by the UE 400, at operation block 1006, the eNodeB 300 will wait until the next C-DRX ON duration to transmit a new DL transmission via the PDSCH.

Alternatively, in a scenario where the PUCCH contains a HARQ NACK message which indicates that the DL transmission was received by the UE 400 with one or more errors, at operation block 1008, the eNodeB 300 will evaluate one or more SINR conditions associated with the UE 400 to determine whether to employ additional DL retransmission redundancy procedures. Next, at decision block 1010, the eNodeB 300 will determine whether to bundle a DL retransmission based on the evaluated SINR conditions for the UE 400. For example, as described above, with respect to FIG. 9, when a UE 400 is operating close to an edge region 908 within a network cell 900 it may be necessary for the eNodeB 300 to schedule multiple DL or UL HARQ retransmissions during consecutive TTIs (optionally employing different MCSs for each successive retransmission) to ensure that the corresponding HARQ retransmission is successfully received (e.g., by the UE 400 in the DL or by the eNodeB 300 in the UL), preferably on the first retransmission attempt.

In a scenario, where the eNodeB 300 determines it is necessary to bundle a DL retransmission based on the evaluated SINR conditions for the UE 400 (e.g., when the UE's 400 SINR conditions are poor or moderate, as described above), at operation block 1012, the eNodeB 300 will wait until the next C-DRX ON duration to transmit a bundled DL transmission (e.g., over consecutive TTIs) alongside a new DL transmission (e.g., over consecutive TTIs) via the PDSCH. Alternatively, in a scenario, where the eNodeB 300 determines that it is not necessary to bundle a DL retransmission based on the evaluated SINR conditions for the UE 400 (e.g., when the UE's 400 SINR conditions are good or moderate, as described above), at operation block 1014, the eNodeB 300 will wait until the next C-DRX ON duration to transmit a single DL transmission alongside a new DL transmission (e.g., over consecutive TTIs) via the PDSCH.

Figure 11:
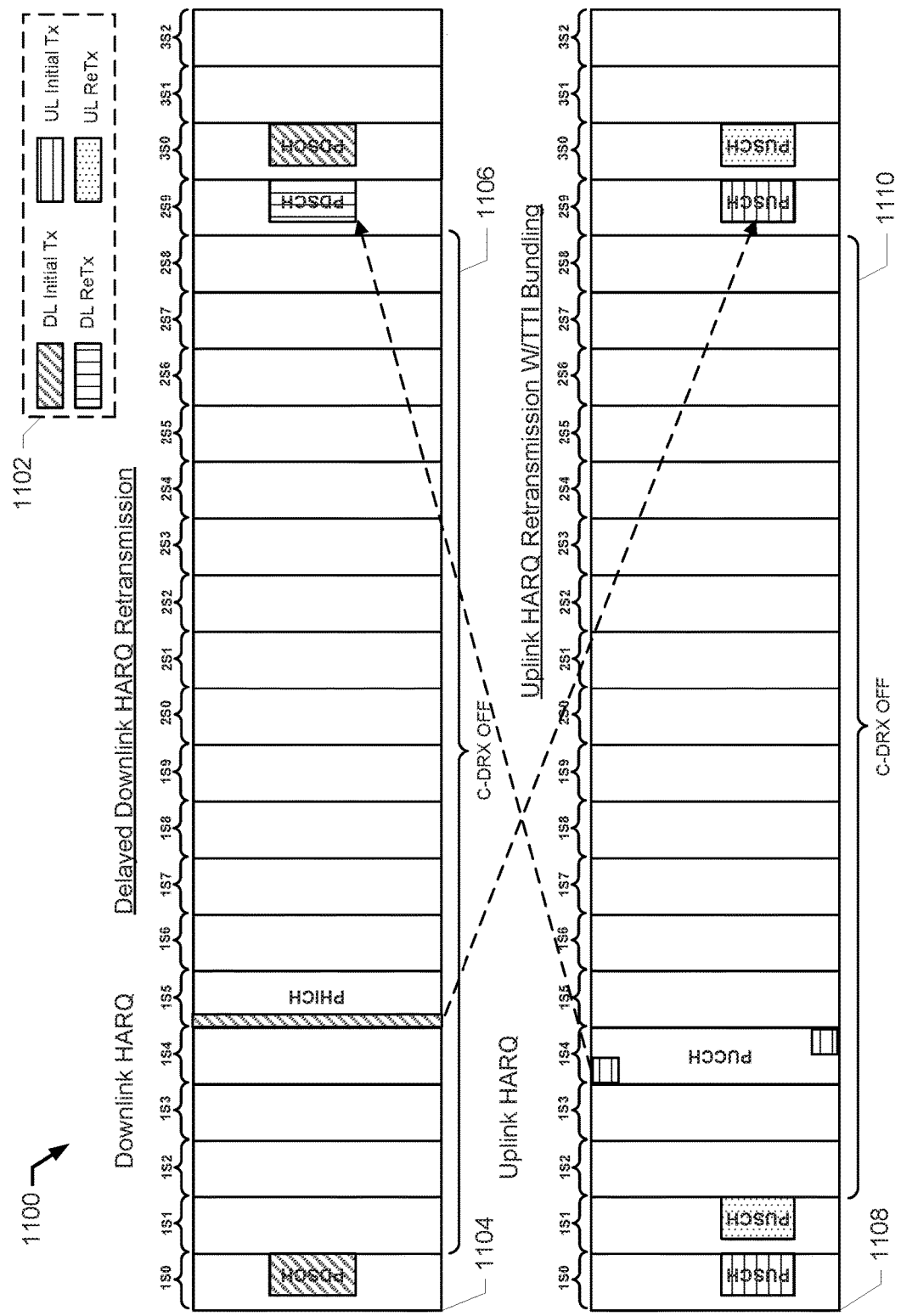
FIG. 11 illustrates a block diagram depicting delayed DL LTE HARQ retransmission procedures, and synchronous UL LTE HARQ retransmission procedures that include transmission time interval (TTI) bundling, in accordance with various implementations of the disclosure.

FIG. 11 illustrates a simplified block diagram 1100 depicting delayed DL LTE HARQ retransmission procedures 1104, and synchronous UL LTE HARQ retransmission procedures 1108 that include TTI bundling, in accordance with various implementations of the disclosure. In accordance with various embodiments, the delayed DL LTE HARQ retransmission procedures 1104 and the synchronous UL LTE HARQ retransmission procedures 1108 can occur, in part, during a C-DRX OFF duration. Further, it should be understood that, although the simplified block diagram 1100 shows DL and UL HARQ procedures, without reference to any SPS procedures, these UE power conservation processes could be included within the context of the delayed DL LTE HARQ retransmission procedures 1104 and the synchronous UL LTE HARQ retransmission procedures 1108, e.g., in a similar manner to that which was described above with respect to FIG. 5. The various transmission and retransmission communications of the DL HARQ 1104 and UL HARQ 1108 processes are represented within the shaded DL/UL communications key 1102, which is provided herewith for reference.

During an initial TTI, associated with a first DL subframe (1S0), an eNodeB 300 can employ its DL radio resource assignment component 314 of its network resource scheduler 312 to transmit a first DL transmission to a corresponding UE 400 via the PDSCH. Four TTIs later, associated with a fifth UL subframe (1S4), a recipient UE 400 can send the eNodeB 300 a HARQ NACK message via the PUCCH to indicate that the first DL transmission was received with one or more errors. Thereafter, the eNodeB 300 can employ its DL HARQ scheduler 318 to process the received NACK message from the UE 400, and subsequently retransmit the failed DL transmission via the PDSCH at the twentieth DL subframe (2S9), fifteen TTIs later. In this manner the eNodeB 300 will effectively wait until the next C-DRX ON duration to transmit a single DL transmission (at 2S9) alongside a new DL transmission (3S0), over consecutive TTIs, via the PDSCH.

As the delayed DL HARQ retransmission (at 2S9) occurs after the C-DRX OFF duration 706 (e.g., during the next C-DRX ON duration), a corresponding UE 400 inactivity period (e.g., a UE C-DRX sleep mode) associated with the DL HARQ retransmission is lengthened with respect to the previous example described above for FIG. 7. Specifically, the new DL inactivity period for the UE 400 is increased to 18 TTIs (from 10 TTIs), as represented by the empty DL subframes ranging from 1S1 through 2S8.

In the UL, LTE HARQ retransmission procedures 1108 with TTI bundling, a UE 400 can transmit a TTI-bundled UL HARQ transmission that includes both an initial UL transmission and an UL retransmission such that the initial UL transmission and the UL retransmission are bundled within consecutive TTIs (e.g., associated with consecutive UL subframes 1S0 and 1S1), via the PUSCH to a corresponding eNodeB. Four TTIs later, associated with a sixth DL subframe (1S5), a recipient eNodeB 300 will presumably send the UE 400 a HARQ ACK message via the PHICH to indicate that the TTI-bundled UL HARQ transmission was received successfully. However, in a scenario where a recipient eNodeB 300 sends the UE 400 a HARQ NACK message via the PHICH to indicate that the TTI-bundled UL HARQ transmission was not received successfully, the UE can retransmit the failed UL HARQ transmission within another TTI-bundled UL HARQ transmission during the next C-DRX ON duration (e.g., at 3S0).

As the TTI-bundled UL HARQ retransmission procedures 1100 occur outside of the C-DRX OFF duration 1106 (e.g., during the preceding C-DRX ON duration or optionally during a subsequent C-DRX ON duration), a corresponding UE 400 inactivity period (e.g., a UE C-DRX sleep mode) associated with the TTI-bundled UL HARQ transmission is lengthened with respect to the previous example described above for FIG. 7. Specifically, the new UL inactivity period for the UE 400 is increased to 17 TTIs (from 10 TTIs), as represented by the empty DL subframes ranging from 1S2 through 2S8.

Figure 12:
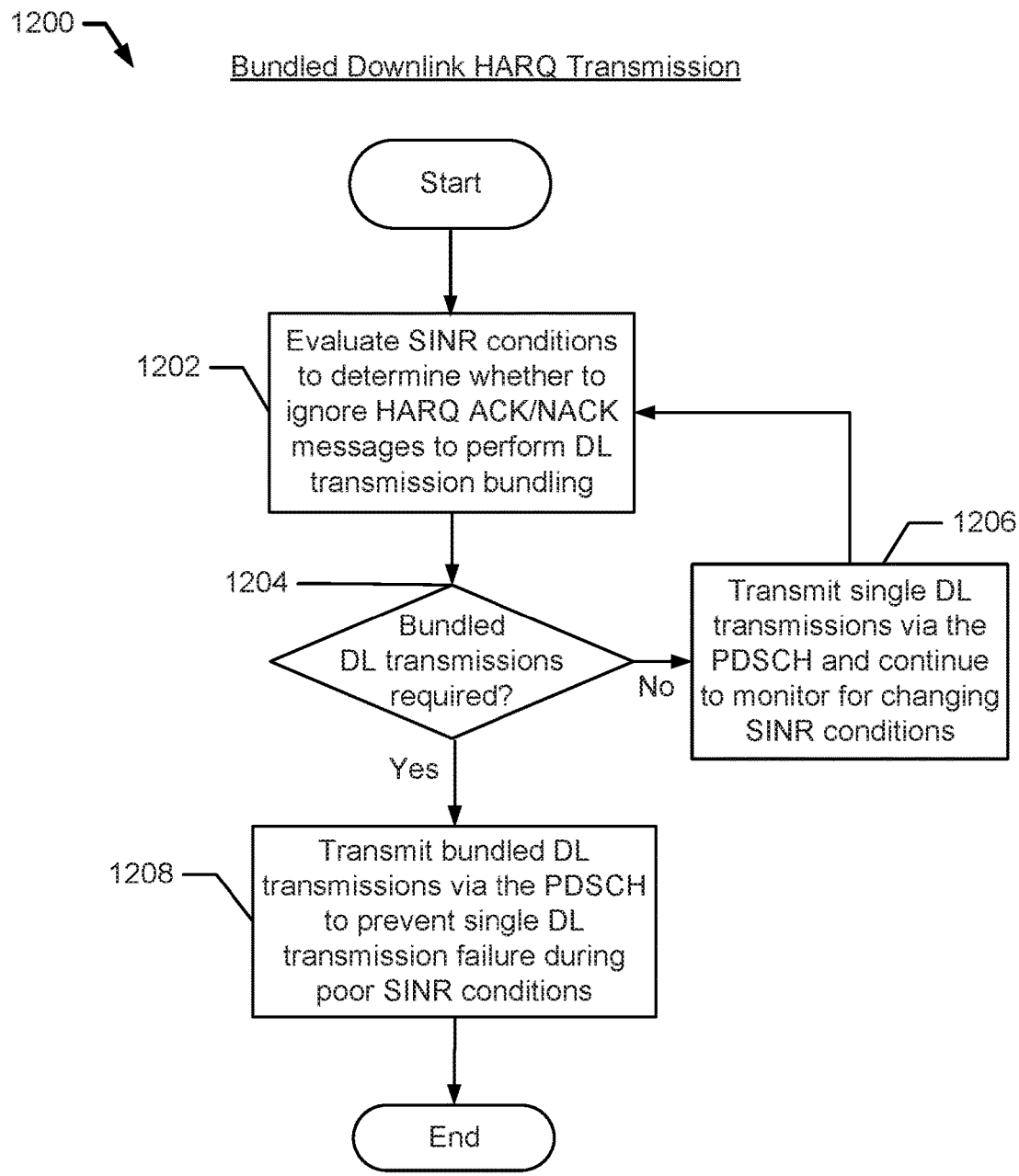
FIG. 12 illustrates a flowchart associated with example methods for performing bundled DL LTE HARQ transmissions, in accordance with some implementations.

FIG. 12 illustrates a flowchart associated with various procedures 1200 for performing bundled DL LTE HARQ transmissions, in accordance with some implementations of the disclosure. In this regard, it should be understood that any or all of the procedures 1200 depicted in FIG. 12 may be associated with a method, or methods, that can be implemented by the execution of computer program instructions stored on a non-transitory computer-readable memory 306 of an eNodeB 300, in conjunction with the execution of computer program instructions stored on a non-transitory computer-readable memory 406 of a UE 400.

Initially, at operation block 1202, an eNodeB 300 may be configured to employ its DL radio resource assignment component 314 (optionally in conjunction with its DL HARQ scheduler component 318) of its network resource scheduler 312 to evaluate various SINR conditions (e.g., as described above with respect to FIG. 9) associated with one or more UEs 400 to determine whether or not it should ignore various HARQ messages (e.g., a HARQ ACK message or a HARQ NACK message) received from a UE 400 during DL communications.

As described above, when an eNodeB 300 determines SINR conditions to be poor (e.g., when a UE 914 is communicating near and edge or periphery region of the LTE cell 900, as shown in FIG. 9), it may be beneficial for the eNodeB 300 to preemptively schedule one or more bundled DL HARQ retransmissions, to improve the likelihood of HARQ retransmission success, and to reduce a number of consecutive TTIs when a UE 400 must remain awake to process HARQ communications during a C-DRX OFF duration. At decision block 1204, the eNodeB 300 can determine if bundled DL transmissions are required, e.g., based on the evaluated SINR conditions which may be transmitted to the eNodeB 300 from the UE 400.

In a scenario where the eNodeB 300 determines that bundled DL transmissions are not required, e.g., when the evaluated SINR conditions are good, at operation block 1206, the eNodeB 300 can transmit a single DL transmission via the PDSCH and perform normal HARQ processing, while continuing to evaluate changing SINR conditions at operation block 1202. Alternatively, in a scenario where the eNodeB 300 determines that bundled DL transmissions are required, e.g., when the evaluated SINR conditions are poor, at operation block 1208, the eNodeB 300 can transmit bundled DL transmission via the PDSCH to prevent single DL transmission failure during poor SINR conditions.

Figure 13:
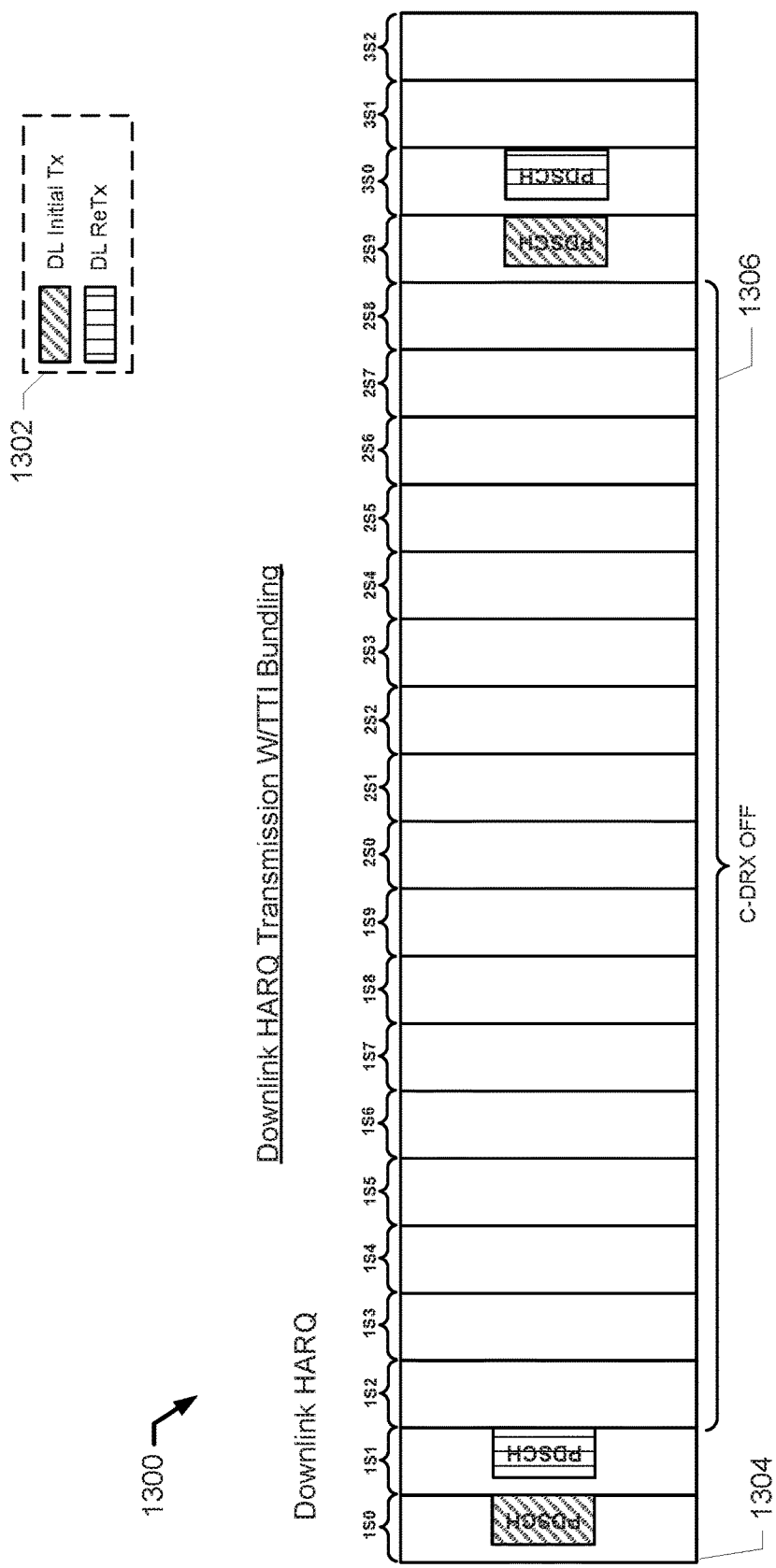
FIG. 13 illustrates a block diagram depicting DL LTE HARQ retransmission procedures that include TTI bundling, in accordance with various embodiments of the disclosure.

FIG. 13 illustrates a block diagram 1300 depicting DL LTE HARQ retransmission procedures 1304 with TTI bundling, which can occur outside of a C-DRX OFF duration 1306. Further, it should be understood that, although the simplified block diagram 1300 shows DL HARQ procedures, without reference to any SPS procedures, these UE power conservation processes could be included within the context of the DL LTE HARQ retransmission procedures with TTI transmission bundling, e.g., in a similar manner to that which was described above with respect to FIG. 5. The various transmission and retransmission communications of the DL HARQ 1304 processes are represented within the shaded DL communications key 1302, which is provided herewith for reference.

Initially, an eNodeB 300 may be configured to employ its DL radio resource assignment component 314 of its network resource scheduler 312 to preemptively schedule a TTI-bundled DL HARQ transmission that includes both an initial DL transmission (at 1S0) and a DL retransmission (at 1S1), during consecutive TTIs, and prior to a corresponding C-DRX OFF duration. In this manner, the eNodeB 300 can improve the likelihood of HARQ retransmission success, while simultaneously reducing a requisite number of consecutive TTIs when a UE 400 must remain awake to process HARQ communications during a C-DRX OFF duration 1306. As described above, when the eNodeB 300 decides to preemptively transmit a TTI-bundled DL HARQ transmission via the PDSCH, it can significantly increase the likelihood of DL transmission success, which can be particularly important during poor SINR conditions.

As the TTI-bundled DL HARQ transmission occurs before the C-DRX OFF duration 1306, a corresponding UE 400 inactivity period (e.g., a UE C-DRX sleep mode) associated with the TTI-bundled DL HARQ transmission is lengthened with respect to the previous example described above for FIG. 7. Specifically, the new DL inactivity period for the UE 400 is increased to 17 TTIs (from 10 TTIs), as represented by the empty DL subframes ranging from 1S2 through 2S8.

Figure 14:
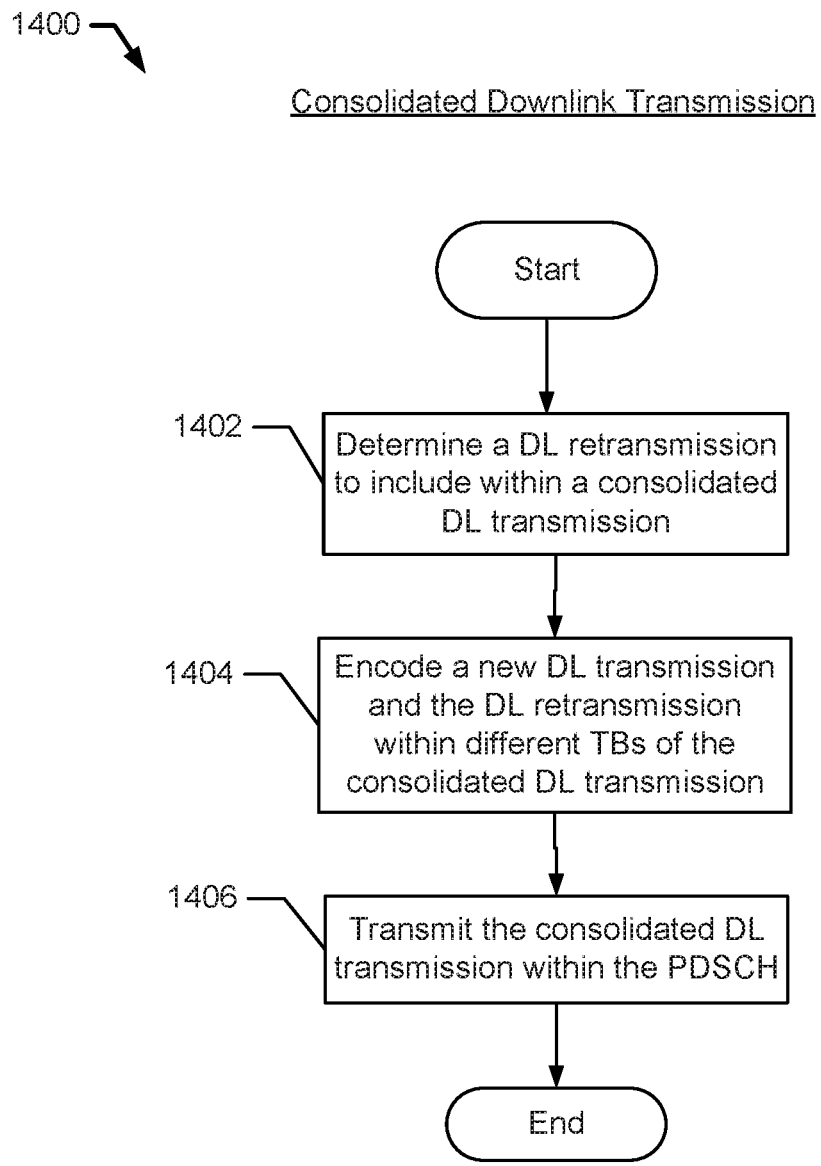
FIG. 14 illustrates a flowchart associated with example methods for performing consolidated DL LTE transmissions, in accordance with some implementations of the disclosure.

FIG. 14 illustrates a flowchart associated with various procedures 1400 for performing consolidated DL LTE transmissions, in accordance with some embodiments of the disclosure. In this regard, it should be understood that any or all of the procedures 1400 depicted in FIG. 14 may be associated with a method, or methods, that can be implemented by the execution of computer program instructions stored on a non-transitory computer-readable memory 306 of an eNodeB 300.

Initially, at operation block 1402, during LTE DL communications between an eNodeB 300 and a UE 400, the eNodeB 300 employing its DL radio resource assignment component 314 (optionally in conjunction with its DL HARQ scheduler component 318) of its network resource scheduler 312 can be configured to initiate (e.g., based on evaluating any of the SINR conditions described above) a consolidated DL transmission (e.g., as described further herein with respect to FIG. 15) for a current DL transmission. At operation block 1404, the eNodeB 300 can encode both a new DL transmission and a DL retransmission within different transport blocks of the same consolidated DL transmission, such that the new Tx TB and the ReTx TB are included within a single LTE subframe associated with a single TTI.

Subsequently, at operation block 1406, the eNodeB 300 can transmit the consolidated DL transmission within the PDSCH of the single LTE subframe to a corresponding UE 400. In this manner, the consolidated DL transmission (including a DL retransmission) can occur before a C-DRX OFF duration 1306. As such, a corresponding UE 400 inactivity period can be extended (with reference to the DL HARQ procedures described above for FIG. 7) to allow a UE 400 to conserve power.

Figure 15:
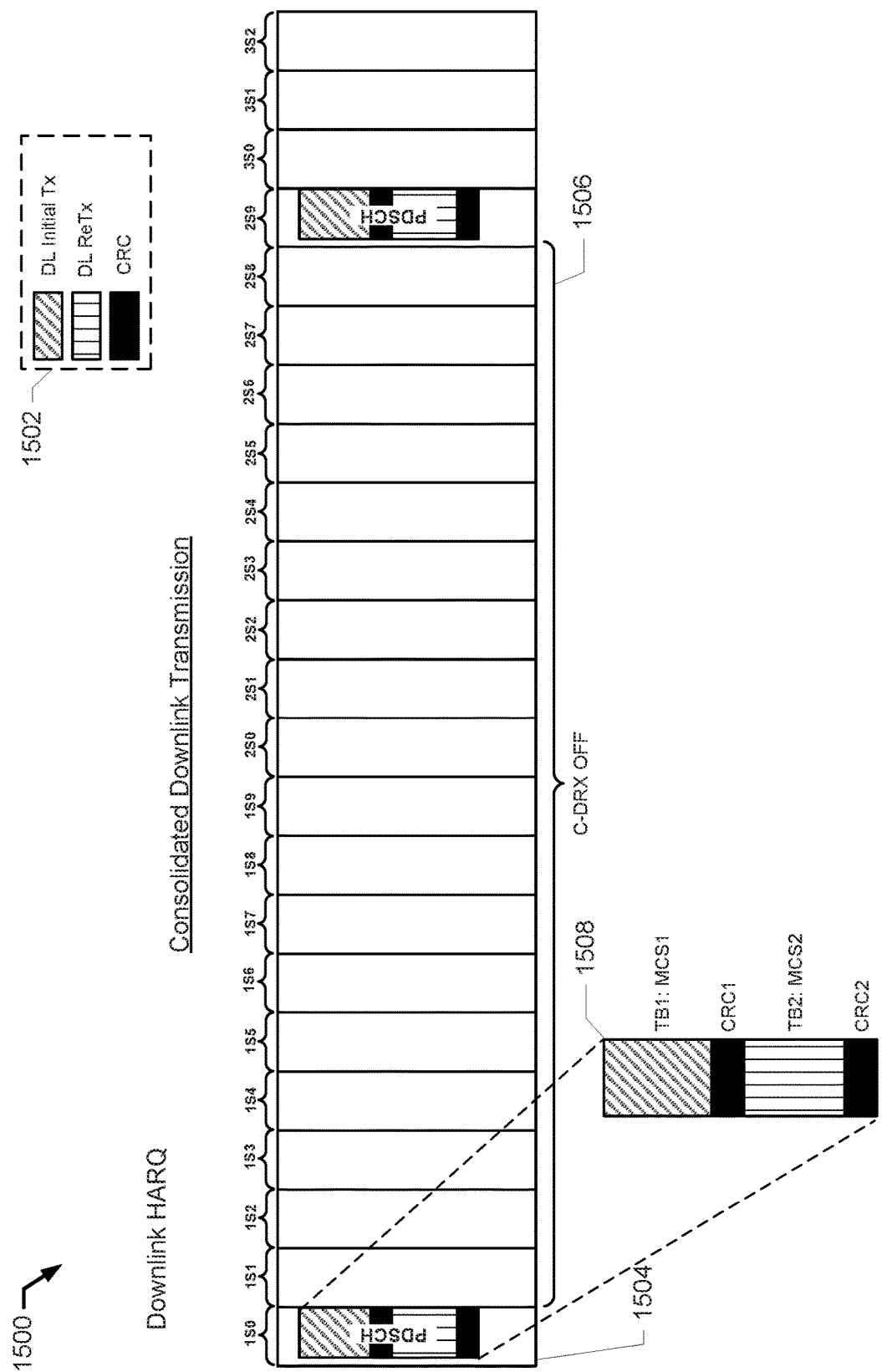
FIG. 15 illustrates a block diagram depicting consolidated DL LTE transmission procedures that include single TTI bundling at the transport block level, in accordance with various embodiments of the disclosure.

FIG. 15 illustrates a simplified block diagram 1500 depicting a consolidated DL LTE transmission 1500 that includes both an initial DL transmission and a DL retransmission within the PDSCH of a single LTE subframe (at 1S0), as depicted in the exploded representation of the PDSCH 1508. The various transmission and retransmission communications of the DL HARQ 1504 processes are represented within the shaded DL communications key 1502, which is provided herewith for reference. Notably, the consolidated DL transmission can include the initial DL transmission within a first TB of the PDSCH 1508 that is associated with a first cyclic redundancy check (CRC1), as well as, a DL retransmission within a second TB of the PDSCH 1508 that is associated with a second cyclic redundancy check (CRC2).

Further, in this consolidated configuration, the initial DL transmission of the first TB can be associated with a first modulation and coding scheme (MCS1), and the DL retransmission of the second TB may be associated with a second modulation and coding scheme (MCS2) that is different from the first MCS1. In accordance with various implementations, the DL retransmission may correspond to either a previously sent DL packet transmission or a current DL packet transmission, e.g., such that the DL retransmission is a duplicate DL packet transmission having a different order MCS. In this manner, the consolidated DL LTE transmission could improve redundancy for a given DL transmission.

In accordance with another embodiment of the disclosure, it may be advantageous for a network service provider to be able to establish a decreased block error rate (BLER) in accordance with various network conditions and/or during different application data-type communications. In this manner, a UE 400 may be able to track C-DRX or SPS patterns of an eNodeB 300 more closely. During HARQ processing, this can result in the UE 400 not having to monitor control channels for ACK/NACK messaging or HARQ retransmissions. As would be understood by those skilled in the art, current BLER targets are set by network operators at 10%.

However, in various implementations, an eNodeB 300 can be configured employ different order MCSs for select application communications (e.g., for VoLTE-type application data communications), using the same SINR values, to establish a decreased target BLER that can be set at a level of 5% or less. In some exemplary embodiments, a target BLER can be set as low as 1%, when an eNodeB 300 is configured to employ the corresponding MCSs for achieving substantially error-free data communications, e.g., for VoLTE communications. By implementing a significantly reduced target BLER for VoLTE, HARQ retransmissions can be significantly reduced or eliminated for these voice communications.

It should be appreciated that by employing this procedure in conjunction with the DL and UL TTI bundling solutions described herein, the necessity of HARQ ACK/NACK messaging and HARQ retransmission may be completely removed for VoLTE communications. Additionally, a UE 400 employing any of the above described procedures, alone or in combination, will advantageously be able to save a significant amount of battery power during VoLTE communications. Specifically, a UE 400 operating in accordance with a reduced BLER target may not need to monitor for HARQ signaling from the LTE network In accordance with some embodiments, a method for bundling HARQ downlink transmissions within an LTE network, may comprise, at a network base station: evaluating at least one radio operating condition of a UE; determining when the at least one radio operating condition is below a radio operating threshold; and in response to determining, ignoring one or more HARQ messages of the UE for a predetermined period of time and bundling a downlink transmission for the UE, where the bundled downlink transmission includes a HARQ retransmission for the UE and a new downlink transmission for the UE.

In some embodiments, the at least one radio operating condition can include an SINR value of the UE. The method may further comprise the network base station ignoring one or more NACK messages or one or more HARQ ACK messages of the UE during the predetermined period of time when the SINR value is determined to be below an SINR threshold value. The method may also comprise transmitting the bundled downlink transmission to the UE after a sleep mode of operation for the UE to allow the UE to conserve power.

In some implementations, the sleep mode of operation for the UE can be an OFF duration of a C-DRX cycle of the UE and the bundled downlink transmission can be transmitted to the UE during a subsequent ON duration of the C-DRX cycle. The method may further involve continuing to bundle HARQ retransmissions for the UE with new downlink transmissions for the UE until the at least one radio operating condition of the UE improves to a point where the radio operating condition is no longer below the radio operating threshold. In various embodiments, the method may include determining when the at least one radio operating condition is no longer below the radio operating threshold and in response to determining, listening for HARQ messages from the UE and periodically evaluating the radio operating condition of the UE.

In some configurations, a network base station, may comprise: at least one transceiver configurable to communicate via an LTE network; one or more processors; and a storage device storing executable instructions that, when executed by the one or more processors, cause the network base station to: evaluate at least one radio operating condition of a UE; determine when the at least one radio operating condition is below a radio operating threshold; and in response to determining, ignore one or more HARQ messages of the UE for a predetermined period of time and bundling a downlink transmission for the UE, where the bundled downlink transmission includes a HARQ retransmission for the UE and a new downlink transmission for the UE.

In various embodiments, the at least one radio operating condition can include an SINR value of the UE, and the execution of the executable instructions may further cause the network base station to ignore one or more HARQ NACK messages or one or more HARQ ACK messages of the UE during the predetermined period of time when the SINR value is determined to be below an SINR threshold value.

In some implementations, a non-transitory computer-readable medium storing executable instructions that, when executed by one or more processors of a network base station, may cause the network base station to: evaluate an SINR value of a UE; determine when the SINR value of the UE is below an SINR threshold value; and in response to determining, ignore one or more HARQ messages of the UE for a predetermined period of time and bundling a downlink transmission for the UE, where the bundled downlink transmission includes a HARQ retransmission for the UE and a new downlink transmission for the UE.

In some embodiments, a method for consolidating a downlink transmission for a UE communicating within an LTE network, can comprise, at a network base station: identifying a HARQ retransmission to send to the UE; encoding a new downlink transmission within a first transport block of a consolidated downlink transmission; encoding the HARQ retransmission within a second transport block of the consolidated downlink transmission; and sending the consolidated downlink transmission to the UE within a single TTI.

In some aspects, the first transport block and the second transport block of the consolidated downlink transmission may be associated with the same LTE subframe. Further, the consolidated downlink transmission may be transmitted to the UE on the PDSCH. In some configurations, the consolidated downlink transmission can be transmitted to the UE prior to an OFF duration of a C-DRX cycle of the UE to extend an inactivity period for the UE and conserve power.

In some implementations, the new downlink transmission encoded within the first transport block may be associated with a first cyclic redundancy check (CRC) and the HARQ retransmission encoded within the second transport block may be associated with a second CRC. Further, the new downlink transmission of the first transport block can be encoded using a first MCS and the HARQ retransmission of the second transport block can be encoded using a second MCS. In other aspects, the HARQ retransmission may be a duplicate transmission of the new downlink transmission having a different order MCS, such that the second MCS is of a different order than the first MCS.

In various embodiments, a network base station can comprise at least one transceiver configurable to communicate via an LTE network, one or more processors, and a storage device storing executable instructions that, when executed by the one or more processors, cause the network base station to: identify a HARQ retransmission to send to a UE; encode a new downlink transmission within a first transport block of a consolidated downlink transmission; encode the HARQ retransmission within a second transport block of the consolidated downlink transmission; and send the consolidated downlink transmission to the UE within a single TTI.

In some configurations, the first transport block and the second transport block of the consolidated downlink transmission may be associated with the same LTE subframe and the consolidated downlink transmission can be transmitted to the UE on the PDSCH. In other aspects, the new downlink transmission encoded within the first transport block can be associated with a first CRC and the HARQ retransmission encoded within the second transport block may be associated with a second CRC. Further, the new downlink transmission of the first transport block may be encoded using a first MCS and the HARQ retransmission of the second transport block may be encoded using a second MCS having a different order than the first MCS.

In some implementations, a non-transitory computer-readable medium storing executable instructions that, when executed by one or more processors of a network base station, can cause the network base station to: identify a HARQ retransmission to send to a UE; encode a new downlink transmission within a first transport block of a consolidated downlink transmission; encode the HARQ retransmission within a second transport block of the consolidated downlink transmission; and send the consolidated downlink transmission to the UE within a single TTI.

In various embodiments, a method for performing a HARQ uplink communication via an LTE network, can comprise, a mobile device: monitoring a PHICH for an initial communication; receiving a NACK message from the LTE network within the initial communication on the PHICH; in response to receiving the NACK message, identifying a PUSCH resource for sending a HARQ retransmission to the LTE network; and waiting until a next ON duration of a C-DRX cycle to send the HARQ retransmission to the LTE network using the PUSCH resource.

In various aspects, the PUSCH resource can be a subframe location on the PUSCH for sending the HARQ retransmission to the LTE network and the subframe location on the PUSCH may be scheduled for sending the HARQ retransmission after a next OFF duration of the C-DRX cycle. The method may further comprise, receiving a HARQ retransmission allocation on a PDCCH from the LTE network and identifying the PUSCH resource based on the received HARQ retransmission allocation.

In some embodiments, a mobile device can comprise at least one transceiver configurable to communicate via an LTE network, one or more processors, and a storage device storing executable instructions that, when executed by the one or more processors, can cause the mobile device to: monitor a PHICH for an initial communication; receive a NACK message from the LTE network within the initial communication on the PHICH; in response to receiving the NACK message, identify a PUSCH resource for sending a HARQ retransmission to the LTE network; and wait until a next ON duration of a C-DRX cycle to send the HARQ retransmission to the LTE network using the PUSCH resource.

In various implementations, the PUSCH resource can be a subframe location on the PUSCH for sending the HARQ retransmission to the LTE network after a next OFF duration of the C-DRX cycle. Further, in some aspects, execution of the executable instructions further causes the mobile device to: receive a HARQ retransmission allocation on a PDCCH from the LTE network and identify the PUSCH resource based on the received HARQ retransmission allocation.

In some embodiments, a non-transitory computer-readable medium storing executable instructions that, when executed by one or more processors of a mobile device, can cause the mobile device to: monitor a PHICH for an initial communication; receive a NACK message from the LTE network within the initial communication on the PHICH; receive a HARQ retransmission allocation on a PDCCH from the LTE network; in response to receiving the NACK message, identify a PUSCH resource for sending a HARQ retransmission to the LTE network based on the received HARQ retransmission allocation; and wait until a next ON duration of a C-DRX cycle to send the HARQ retransmission to the LTE network using the PUSCH resource.

The various aspects, embodiments, implementations or features of the described embodiments can be used separately or in any combination. Further, some aspects of the described embodiments may be implemented by software, hardware, or a combination of hardware and software. The described embodiments can also be embodied as computer program code stored on a non-transitory computer-readable medium. The computer-readable-medium may be associated with any data storage device that can store data which can thereafter be read by a computer or a computer system. Examples of the computer-readable medium include read-only memory, random-access memory, CD-ROMs, HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. An apparatus configurable for operation in a mobile device, the apparatus comprising:
    at least one transceiver configurable for communication with a wireless network; and
    processing circuitry comprising one or more processors and memory storing instructions,
    wherein execution of the instructions by the processing circuitry causes the apparatus to:
        identify a downlink transmission from a network base station of the wireless network as erroneous;
        transmit a negative acknowledgement (NACK) message as part of a hybrid automatic repeat request (HARQ) communication to the network base station via the at least one transceiver;
        in response to a delayed HARQ retransmission, remain inactive during a sleep mode of operation of the mobile device to conserve power; and
        receive the delayed HARQ retransmission after the sleep mode of operation,
        wherein the delayed HARQ retransmission is part of a bundled data transmission that is received within consecutive transmission time intervals (TTIs).

2. The apparatus of claim 1, wherein the downlink transmission is identified as erroneous when:
    an expected downlink transmission is not received, or
    the downlink transmission is received, but the received downlink transmission comprises one or more errors.

3. The apparatus of claim 1, wherein the sleep mode of operation is an OFF duration of a connected mode discontinuous reception (C-DRX) cycle.

4. The apparatus of claim 1, wherein the the apparatus receives the delayed HARQ retransmission during a subsequent ON duration of a connected mode discontinuous reception (C-DRX) cycle.

5. The apparatus of claim 1, wherein the bundled data transmission is received on a physical downlink shared channel (PDSCH), and the bundled data transmission further comprises a new downlink transmission.

6. The apparatus of claim 1, wherein the bundled data transmission comprises a plurality of HARQ transmissions that employ different modulation and coding schemes (MCSs).

7. The apparatus of claim 1, wherein the apparatus transmits the NACK message to the network base station on a physical uplink control channel (PUCCH).

8. A method of conserving power by a mobile device, the method comprising:
    by the mobile device:
        identifying a downlink transmission from a network base station as erroneous;
        transmitting a negative acknowledgement (NACK) message as part of a hybrid automatic repeat request (HARQ) communication to the network base station using at least one transceiver of the mobile device;
        in response to a delayed HARQ retransmission, remaining inactive during a sleep mode of operation of the mobile device to conserve power; and
        receiving the delayed HARQ retransmission after the sleep mode of operation,
        wherein the delayed HARQ retransmission is part of a bundled data transmission that is received by the mobile device within consecutive transmission time intervals (TTIs).

9. The method of claim 8, wherein the downlink transmission is identified as erroneous by the mobile device when:
    the mobile device does not receive an expected downlink transmission, or
    the downlink transmission is received by the mobile device, but the received downlink transmission comprises one or more errors.

10. The method of claim 8, wherein the sleep mode of operation is an OFF duration of a connected mode discontinuous reception (C-DRX) cycle of the mobile device.

11. The method of claim 8, wherein the mobile device receives the delayed HARQ retransmission during a subsequent ON duration of a connected mode discontinuous reception (C-DRX) cycle of the mobile device.

12. The method of claim 8, wherein the bundled data transmission is received by the mobile device on a physical downlink shared channel (PDSCH), and the bundled data transmission further comprises a new downlink transmission.

13. The method of claim 8, wherein the bundled data transmission comprises a plurality of HARQ transmissions that employ different modulation and coding schemes (MCSs).

14. The method of claim 8, wherein the mobile device transmits the NACK message to the network base station on a physical uplink control channel (PUCCH).

15. An apparatus configurable for operation in a network base station of a long term evolution (LTE) network, the apparatus comprising:
   wireless circuitry configurable for communication with a user equipment (UE); and
   processing circuitry comprising one or more processors and memory storing instructions,
   wherein execution of the instructions by the processing circuitry causes the apparatus to:
      monitor a control channel for hybrid automatic repeat request (HARQ) information;
      receive a negative acknowledgement (NACK) message from the UE;
      in response to receiving the NACK message, delay a HARQ retransmission for the UE such that the UE can remain inactive during a sleep mode of operation; and
      bundle the HARQ retransmission for the UE within consecutive downlink transmission time intervals (TTIs).

16. The apparatus of claim 15, wherein the sleep mode of operation is an OFF duration of a connected mode discontinuous reception (C-DRX) cycle of the UE.

17. The apparatus of claim 16, wherein the HARQ retransmission is delayed until a subsequent ON duration of the C-DRX cycle of the UE.

18. The apparatus of claim 15, wherein the HARQ retransmission is bundled with a new downlink transmission.

19. The apparatus of claim 15, wherein the NACK message is received on a physical uplink control channel (PUCCH).

20. The apparatus of claim 15, wherein the HARQ retransmission is transmitted on a physical downlink shared channel (PDSCH).

* * * * *